US011280424B2

(12) United States Patent
Weiss et al.

(10) Patent No.: US 11,280,424 B2
(45) Date of Patent: Mar. 22, 2022

(54) FAILSAFE SYSTEM FOR A 270 DEGREE ACTUATOR

(71) Applicant: Johnson Controls Technology Company, Auburn Hills, MI (US)

(72) Inventors: Kevin A. Weiss, Gurnee, IL (US); Gary A. Romanowich, Slinger, WI (US); Stephanie P. Lynn, Milwaukee, WI (US); Russell T. Jenks, Racine, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 16/429,795

(22) Filed: Jun. 3, 2019

(65) Prior Publication Data

US 2020/0378517 A1 Dec. 3, 2020

(51) Int. Cl.
*G05B 9/02* (2006.01)
*F16K 31/04* (2006.01)
*H02J 9/06* (2006.01)
*F16K 37/00* (2006.01)
*F16K 11/087* (2006.01)

(52) U.S. Cl.
CPC ............ *F16K 31/042* (2013.01); *F16K 31/04* (2013.01); *F16K 31/041* (2013.01); *F16K 37/00* (2013.01); *G05B 9/02* (2013.01); *H02J 9/061* (2013.01); *F16K 11/0876* (2013.01)

(58) Field of Classification Search
CPC ...... F16K 31/041; F16K 31/042; F16K 37/00; G02B 9/02
See application file for complete search history.

(56) References Cited

U.S. PATENT DOCUMENTS

| 3,588,652 | A | * | 6/1971 | Lewis | ...................... H02H 7/09 318/282 |
| 5,278,454 | A | | 1/1994 | Strauss et al. | |
| 5,422,808 | A | * | 6/1995 | Catanese, Jr | ...... G05B 19/4063 700/79 |
| 5,519,295 | A | | 5/1996 | Jatnieks | |
| 5,744,876 | A | | 4/1998 | Fangio | |
| 5,744,923 | A | | 4/1998 | Strauss et al. | |
| 6,100,655 | A | | 8/2000 | McIntosh | |
| 7,023,163 | B2 | | 4/2006 | Charles et al. | |

(Continued)

FOREIGN PATENT DOCUMENTS

| CN | 205781222 | 12/2016 |
| KR | 549772 | 2/2006 |

(Continued)

*Primary Examiner* — Rina I Duda
(74) *Attorney, Agent, or Firm* — Foley & Lardner LLP

(57) ABSTRACT

An actuator includes a drive device, and energy storage element and an actuator controller. The energy storage element is charged during operation of the actuator using power from an external power source. The drive device drives a valve member to a failsafe setpoint using energy from the energy storage element in the event of a power loss during operation of the actuator. The actuator controller provides a drive signal to the drive device indicating the valve member orientation (i.e. the failsafe setpoint) to which the drive device is to drive the valve member. The failsafe setpoint is determined based on the last fluid source that was controlled by the actuator of the fluid system prior to the power outage.

15 Claims, 18 Drawing Sheets

(56) References Cited

U.S. PATENT DOCUMENTS

| | | |
|---|---|---|
| 7,671,569 B2 | 3/2010 | Kolb et al. |
| 8,138,706 B2 | 3/2012 | Ochsenbein et al. |
| 8,242,624 B2 | 8/2012 | Brookfield |
| 9,024,591 B2 | 5/2015 | Narita |
| 9,379,577 B2 | 6/2016 | Stupka |
| 9,812,898 B2 | 11/2017 | Spivey et al. |
| 10,133,251 B2 | 11/2018 | Furrer et al. |
| 2015/0226343 A1* | 8/2015 | Jenks .................. F16K 11/0873 137/1 |
| 2016/0061468 A1 | 3/2016 | Alexander et al. |
| 2017/0293293 A1 | 10/2017 | Brownie et al. |
| 2017/0295058 A1 | 10/2017 | Gottschalk et al. |
| 2018/0067465 A1* | 3/2018 | Daraiseh .................. G05B 9/02 |

FOREIGN PATENT DOCUMENTS

| | | |
|---|---|---|
| KR | 101259450 | 4/2013 |
| WO | WO-2018/011150 A1 | 1/2018 |

\* cited by examiner

| Clockwise Rotation | | | | |
|---|---|---|---|---|
| Valve Position | 0° | 90° | 180° | 270° |
| Fluid Source 1 | Full flow | No flow | No flow | No flow |
| Fluid Source 2 | No flow | No flow | No flow | Full flow |
| Input 1 (Y1) | 10 VDC | 0(2) VDC | 0(2) VDC | 0(2) VDC |
| Input 2 (Y2) | 0(2) VDC | 0(2) VDC | 0(2) VDC | 10VDC |
| Counterclockwise Rotation | | | | |

| Clockwise Rotation | | | | |
|---|---|---|---|---|
| Valve Position | 0° | 90° | 180° | 270° |
| Fluid Source 1 | Full flow | No flow | No flow | No flow |
| Fluid Source 2 | No flow | No flow | No flow | Full flow |
| Input 1 (Y3) | 0(2) VDC | 4.5(5.6) VDC | 5.5(6.4) VDC | 10 VDC |
| Counterclockwise Rotation | | | | |

FAILSAFE SYSTEM FOR A 270 DEGREE ACTUATOR

BACKGROUND

Valves are devices that regulate, direct, and/or control the flow of a fluid (e.g., gases, liquids, fluidized solids, slurries, etc.) by opening, closing, or partially obstructing various passageways. Valves are often categorized based on the mechanism used to control fluid flow (e.g., ball valves, butterfly valves, choke valves, piston valves, plug valves, poppet valves, etc.).

Ball valves are a type of valve that typically include a spherical disc or valve member carried within a valve body. The spherical valve member includes a passage that can be selectively aligned with ports in the valve body by rotating the valve member relative to the valve body. When the passage aligns with one port and any number of the remaining ports, the valve is said to be in the open position. When the passage is out of alignment with the ports, the valve is said to be in the closed position. Ball valves are categorized as "quarter-turn" valves because a ninety degree rotation of the valve member (i.e., a quarter turn) is typically used to transition the valve between the open position and the closed position.

Ball valves can be classified based on the number of connections formed by the valve (e.g., two-way valves, three-way valves, etc.), the shape of the passage through the spherical valve member (e.g., L-shaped, T-shaped, X-shaped, etc.), and the size of the passage through the valve member (e.g., full bore, reduced bore, etc.). Three-way ball valves are often used to switch between two separate fluid supplies and/or returns.

Conventional three-way ball valves do not transition between supplies and/or returns without mixing. In a conventional three-way ball valve, rotating the valve member typically causes the flow rate of one fluid supply to be incrementally increased while the flow rate of another fluid supply is incrementally decreased. When the valve member is halfway rotated, the resulting fluid output is generally a mixture of the two fluid supplies.

SUMMARY

According to one implementation of the present disclosure, an actuator includes a drive device, an energy storage element, and a controller. The controller operates in a first mode when the actuator receives power from an external power source and operates in a second mode when the actuator detects a loss of power from the external power source. In the first mode the controller controls the drive device to effectuate a flow of fluid from one of a first fluid source and a second fluid source through a valve to which the drive device is operably attached. In a second mode, the controller generates a first drive signal configured to effectuate a movement of the valve member to a first position along a travel path of the valve in response to determining that the actuator was operating to control a flow of fluid from the first fluid source through the valve prior to the loss of power, and generates a second drive signal configured to effectuate a movement of the valve member to a second position along the travel path in response to determining that the actuator was operating to selectively control a flow of fluid from the second fluid source through the valve prior to the loss of power. The drive device drives the valve member in accordance with one of the first drive signal and the second drive signal using energy from the energy storage element.

In some embodiments, the drive device comprises a motor. In some embodiments, the energy storage element is charged by the external power source while energy from the external power source is used to operate the drive device. In some embodiments, energy from the external power source is received by the energy storage element while the drive device receives energy from the energy storage element. In some embodiments, no energy from the external power source is received by the energy storage element while the drive device receives energy from the energy storage element.

According to one implementation of the present disclosure, an actuator includes a drive device, an energy storage element, and a controller that generates a failsafe drive signal in response to detecting a loss of power to the actuator from an external power source. Upon the loss of power to the actuator, the drive device drives a valve member of a valve to which the actuator is operably coupled in a first direction to a first position along a travel path corresponding to a first valve member orientation in which an outlet of the valve is blocked by the valve member in response to a first failsafe drive signal from the controller, and drives the valve member in a second direction, opposite the first direction, to a second position along the travel path corresponding to a second valve member orientation in which the outlet of the valve is blocked by the valve member, in response to a second failsafe drive signal from the failsafe controller. The drive device drives the valve member using energy received from the energy storage element.

In some embodiments, the controller generates the first drive signal in response to determining that the actuator is being operated to control a flow of fluid from a first fluid supply source through the valve, and generates the second drive signal in response to determining that the actuator is being operated to control a flow of fluid from a second fluid supply source through the valve.

In some embodiments, the valve controlled by the actuator defines a valve member travel path in which a first end of the travel path defines a valve member orientation corresponding to a maximum flow of fluid from the first fluid supply source through the valve outlet, a second end of the travel path defines a valve member orientation corresponding to a maximum flow of fluid from the second fluid supply source through the valve outlet, and a no-flow portion of the travel path located between the first end and the second end corresponds to one or more valve member orientations in which the outlet of the valve is blocked by the valve member. In some embodiments, the first position and the second position correspond to the same valve member orientation. In some embodiments, the first position and the second position correspond to different valve member orientations.

In some embodiments, a first travel path portion in which the first fluid supply source is in fluid communication with the valve outlet is defined between the first end and the no-flow portion of the travel path, and a second travel path portion in which the second fluid supply source is in fluid communication with the valve outlet is defined between the second end and the no-flow portion of the travel path. The first position is located at a position along the no-flow portion of the travel path adjacent the first travel path portion, and the second position is located at a position along the no-flow portion of the travel path adjacent the second travel path portion.

In some embodiments, the drive device comprises a motor. In some embodiments, the motor is operated using energy from the energy storage element when energy from the external power source is received by the actuator. In some embodiments, the energy storage element is charged by the external power source when the motor is operated using energy from the external power source. In some embodiments, no energy from the external power source is received by the motor while the motor is operated using energy from the energy storage element.

According to one implementation of the present disclosure, a method includes determining a location of a valve member of a valve along a travel path of the valve in response to detecting a loss of power from an external power source to an actuator operably coupled to the valve; generating, by a controller, a drive signal in response to detecting the loss of power to the actuator; receiving, by a drive device of the actuator, the drive signal; and driving, by the drive device, the valve member to a failsafe valve member position along the travel path based on the received drive signal using energy stored by an energy storage element of the actuator. The controller generates a drive signal that causes the drive device to drive the valve member to a first failsafe valve member orientation in response to determining that the location of the valve member corresponds to a first portion of the travel path. The controller generates a second drive signal that causes the drive device to drive the valve member to a second failsafe valve member orientation in response to determining that the location of the valve member corresponds to a second portion of the travel path.

In some embodiments, the energy storage element is charge using power from the external power source. The energy storage element is configured to supply the drive device with energy only in response to a loss of power from the external power source to the actuator. In some embodiments, the drive device comprises a motor.

In some embodiments, the drive device is configured to drive the valve member in a first direction to reach the first failsafe valve member orientation, and to drive the valve member in a second direction, opposite the first direction, to reach the second failsafe valve member orientation. Each of the first failsafe valve member orientation and second failsafe valve member orientation correspond to a valve member orientation in which flow through an outlet of the valve is blocked by the valve member. In some embodiments, the first portion of the travel path corresponds to valve member orientations in which a first fluid supply source is in fluid communication with an outlet of the valve, and the second portion of the travel path corresponds to valve member orientations in which a second fluid supply source is in fluid communication with the outlet of the valve.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Referring generally to the FIGURES, systems and methods for controlling fluid flow with a 270 degree rotatable valve are shown, according to various exemplary embodiments. The systems and methods described herein may be used to regulate fluid flow from multiple fluid supplies and/or to multiple fluid returns. In some embodiments, the valve is a three-way valve having a valve body and a 270 degree rotatable valve member. The valve body may include a valve chamber and a plurality of ports into the valve chamber (e.g., a first port, a second port, a third port, etc.). The valve member may have an L-shaped passage extending therethrough. The valve may be controlled (e.g., by an actuator and/or a controller) to rotate the valve member by approximately 270 degrees within the valve chamber.

Conventional three-way valves rotate by only 90 degrees to transition between fluid supplies or fluid returns and typically mix the fluid supplies/returns during the transition. To prevent mixing from occurring, conventional three-way valves often have a reduced-bore passage through the rotatable valve member (e.g., reduced relative to the pipelines connecting to the valve). A reduced-bore passage increases friction losses through the valve and causes a pump supplying fluid to the valve to work harder to maintain a satisfactory fluid flow. Advantageously, the systems and methods of the present disclosure use a valve that is rotatable by 270 degrees to switch between fluid supplies and/or fluid returns without mixing and without reducing the bore size.

Figure 1:
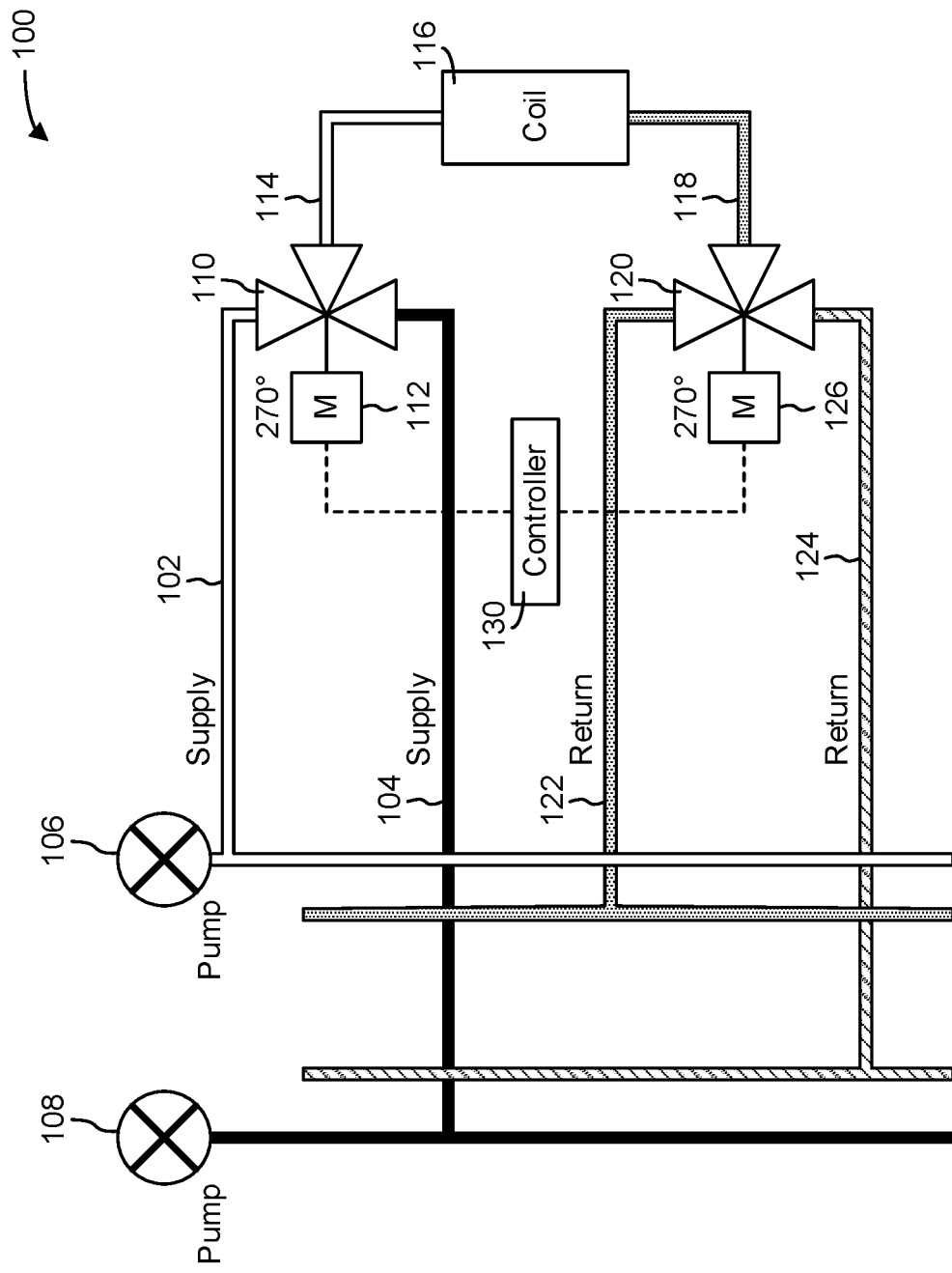
FIG. 1 is drawing of a fluid system including at least one valve configured to rotate by 270 degrees to switch, without mixing, between multiple fluid supplies and/or multiple fluid returns, according to an exemplary embodiment.

Referring now to FIG. 1, a fluid system 100 is shown, according to an exemplary embodiment. Fluid system 100 is shown to include a first fluid supply 102 and a second fluid supply 104. In some embodiments, fluid system 100 is a water manifold system. In a water manifold system, first fluid supply 102 may be cold water and second fluid supply 104 may be hot water. In other embodiments, first fluid supply 102 and second fluid supply 104 may be various fluids other than water (e.g., various types of gases, liquids, fluidized solids, slurries, etc.). First fluid supply 102 and second fluid supply 104 may have different temperatures (e.g., hot and cold water) or the same temperature.

First fluid supply 102 and second fluid supply 104 are shown connecting to a fluid control valve 110. Valve 110 may be a three-way valve configured to control an amount of first fluid supply 102 and second fluid supply 104 permitted to pass through valve 110 and into coil supply line 114. Valve 110 may be configured to rotate by 270 degrees to modulate a flow rate of first fluid supply 102 (e.g., during an initial 90 degrees of the 270 degree rotation) and of second fluid supply 104 (e.g., during a final 90 degrees of the 270 degree rotation) through valve 110 and into coil supply line 114.

Coil supply line 114 is shown connecting to a fan coil unit 116. Fan coil unit 116 may use the fluid from coil supply line 114 as a thermal reservoir from which heat energy can be absorbed (e.g., from hot water or another warm fluid) and/or into which heat energy can be rejected (e.g., into cold water or another coolant). Fan coil unit 116 may intake fluid from coil supply line 114 and output fluid to a coil return line 118.

Coil return line 118 is shown connecting to another fluid control valve 120. Valve 120 may be the same or similar to valve 110. For example, valve 120 may be a three-way valve configured to selectively divert fluid from coil return line 118 to either a first fluid return 122 or a second fluid return 124. Valve 120 may be configured to rotate by 270 degrees to modulate a flow rate between coil return line 118 and either first fluid return 122 or second fluid return 124 (e.g., without splitting or mixing). In some embodiments, first fluid return 122 is a cold water return and second fluid return 124 is a hot water return (e.g., for embodiments in which fluid system 100 is a water manifold system).

Figure 3:
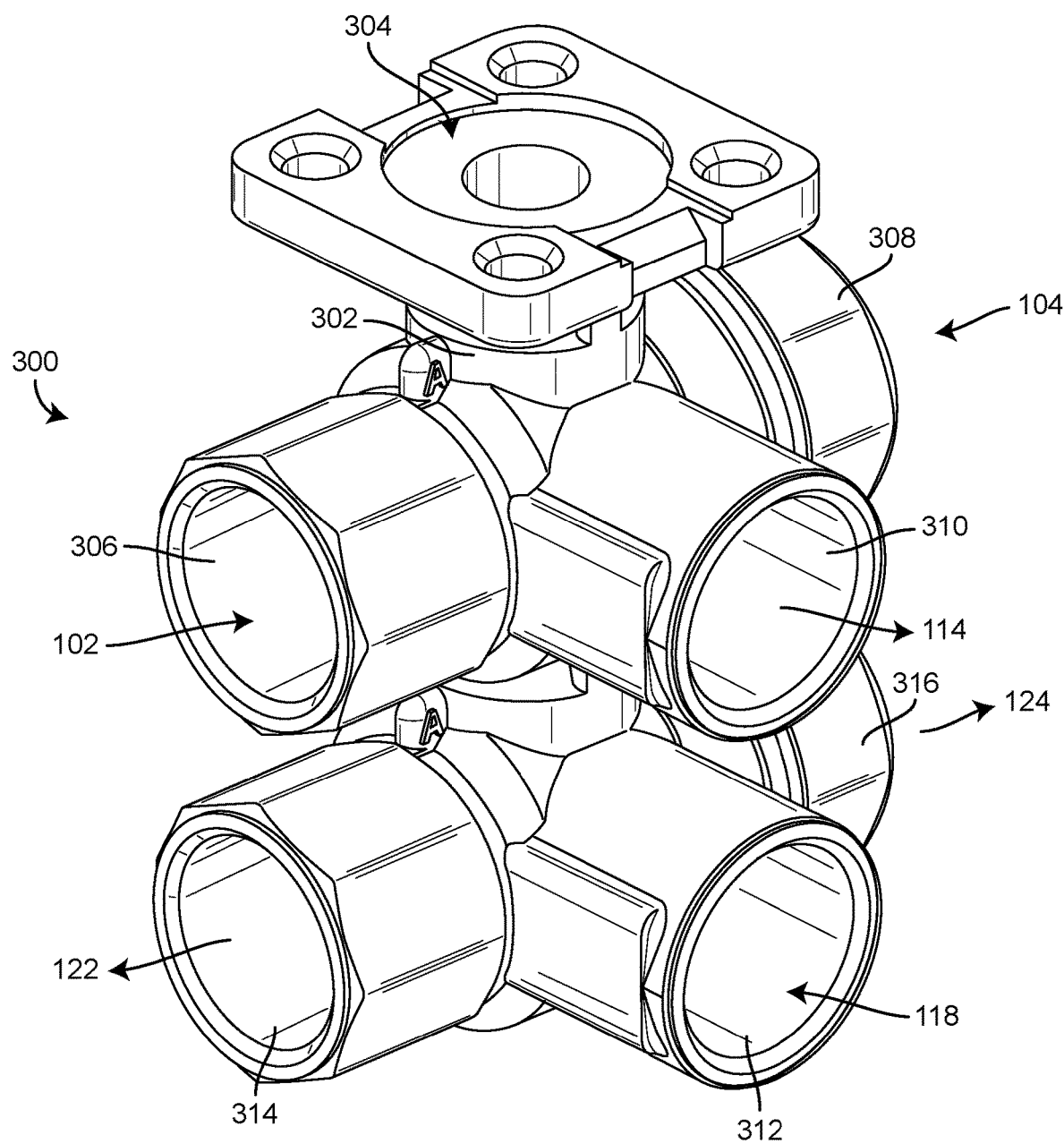
FIG. 3 is a perspective view drawing of a six-way valve configured to simultaneously switch between two fluid supplies and two fluid returns by rotating a single valve member, according to an exemplary embodiment.

Still referring to FIG. 1, fluid system 100 is shown to include a first actuator 112 and a second actuator 126. First actuator 112 may be rotatably coupled to valve 110 and configured to rotate valve 110 by 270 degrees. Second actuator 126 may be rotatably coupled to valve 120 and configured to rotate valve 120 by 270 degrees. In some embodiments, actuators 112 and 126 may be combined into a single actuator (e.g., for embodiments in which valves 110 and 120 are stacked or share a single valve member, as shown in FIG. 3). Actuators 112 and 126 may be electronic actuators configured to operate valves 110 and 120 in response to a control signal received from an electronic controller 130. In other embodiments, actuators 112 and 126 may be manual actuators (e.g., manually operable handles, wheels, etc.) or other devices for controlling a rotational position of valves 110 and 120.

Fluid system 100 is shown to further include fluid pumps 106 and 108. Pump 106 may be fluidly connected with first fluid supply 102 and pump 108 may be fluidly connected with second fluid supply 104. Pumps 106 and 108 may work to maintain first fluid supply 102 and second fluid supply 104 at a particular state or condition (e.g., a particular fluid pressure, flow rate, etc.). Pumps 106 and 108 may be operated by controller 130 (e.g., in response to a control signal received from controller 130), by a separate controller, or in response to a power signal or control signal received from any other source.

Controller 130 may be configured to operate actuators 112 and 126 to regulate fluid flow through fluid system 100. In some embodiments, controller 130 is configured to select either first fluid supply 102 or second fluid supply 104 to deliver to fan coil unit 116. Controller 130 may be configured to modulate a flow rate of first fluid supply 102 and second fluid supply 104 by adjusting a rotational position of valve 110 (e.g., via actuator 112). Controller 130 may be configured to direct the fluid output by fan coil unit 116 to either first fluid return 122 or second fluid return 124 and to control a flow rate of the return fluid by adjusting a rotational position of valve 120 (e.g., via actuator 126).

In some embodiments, controller 130 is a feedback controller configured to receive feedback signals from various sensors (e.g., temperature sensors, pressure sensors, flow rate sensors, position sensors, etc.). The sensors may be arranged to measure a flow rate, temperature, pressure, or other state or condition at various locations within fluid system 100. Controller 130 may operate actuators 112, 126, and/or pumps 106-108 to achieve a setpoint for any variable state or condition measured or calculated from measured variables. An exemplary controller that may be used for controller 130 is described in greater detail with reference to FIG. 10.

Figure 2:
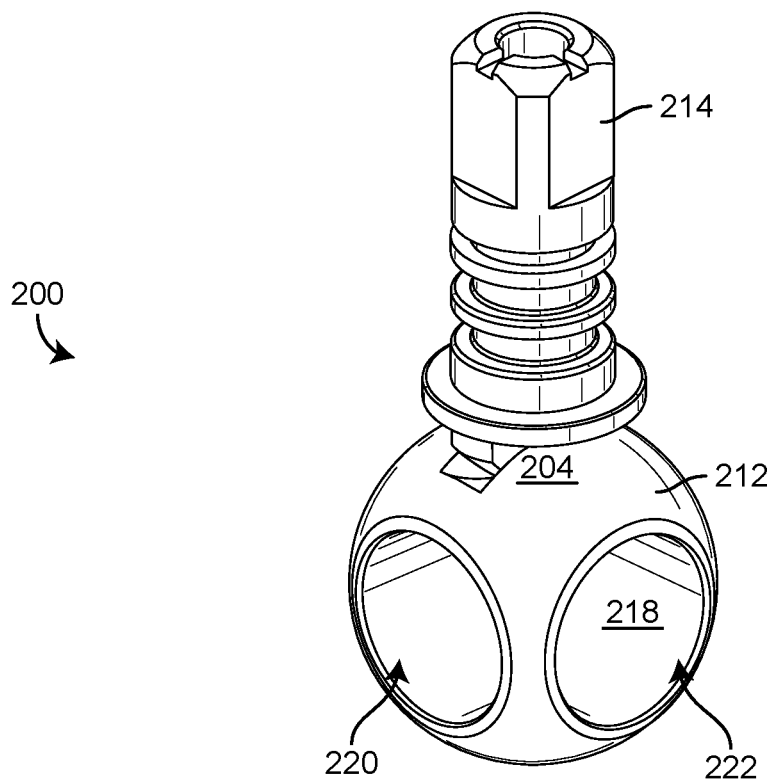
FIG. 2 is an exploded view drawing illustrating the valve of FIG. 1 in greater detail, according to an exemplary embodiment.
Figure 2:
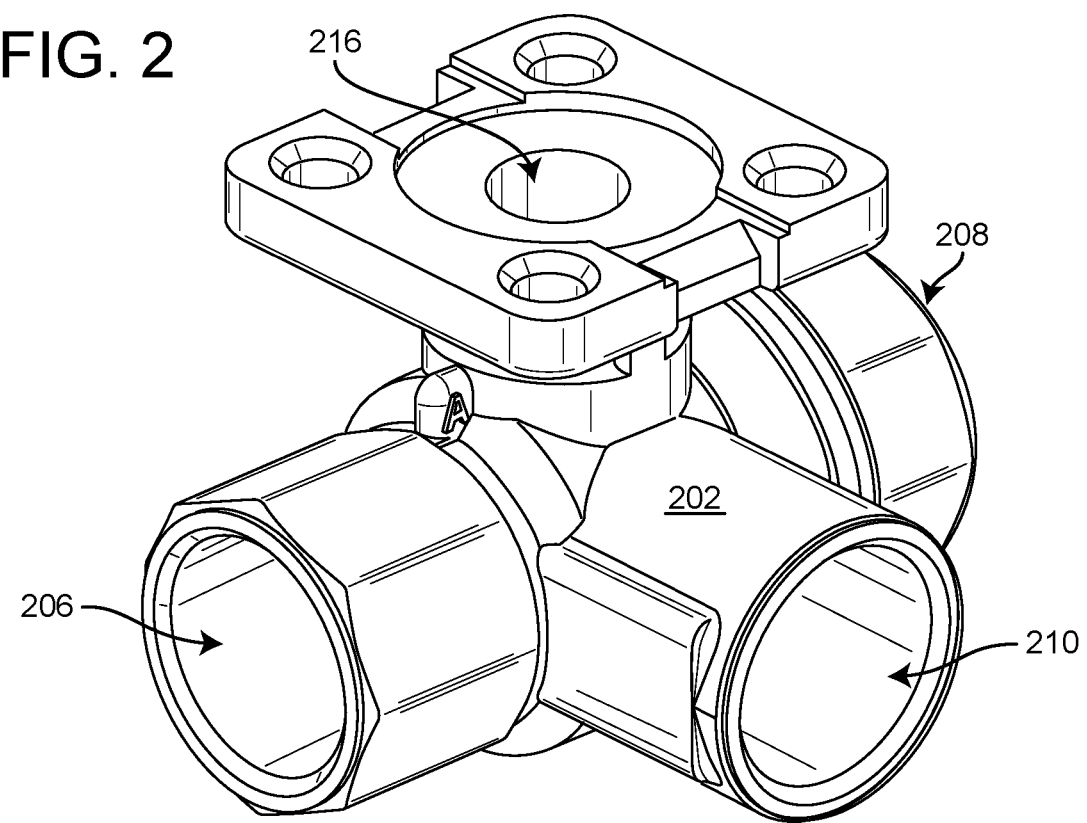

Referring now to FIG. 2, an exploded view drawing of a fluid control valve 200 is shown, according to an exemplary embodiment. Valve 200 may be used as either or both of valves 110 and 120 in FIG. 1. Valve 200 is shown to include a valve body 202 and a valve member 204. Valve body 202 may include an internal valve chamber and a plurality of ports 206-210 into the valve chamber. For example, valve body 202 is shown to include a first port 206, a second port 208, and a third port 210. As shown, first port 206 and second port 208 may be inline ports (e.g., aligned with a common axis) and may be located on opposite sides of the valve chamber. In various embodiments, first port 206 and second port 208 may be located at a variety of different angles relative to each other (e.g., 180 degrees, 120 degrees, etc.). Third port 210 may be a transverse port (i.e., not inline with ports 206 and 208). As shown, third port 210 is substantially perpendicular to ports 206 and 208 and in the same plane as ports 206 and 208. In other embodiments, third port 210 may be oriented at a variety of different angles relative to ports 206 and 208 and may not be in the same plane as ports 206 and 208.

In some embodiments, valve body 202 is a three-way valve body having three ports (e.g., ports 206-210). A three-way valve body may be used to switch between either two fluid supplies or two fluid returns. For example, valve body 202 may be configured to receive a first fluid supply (e.g., first fluid supply 102) at first port 206 and a second fluid supply (e.g., second fluid supply 104) at second port 208. Valve body 202 may switch between the first fluid supply and the second fluid supply by selectively directing either the first fluid supply or the second fluid supply through the internal valve chamber and out third port 210. By controllably rotating valve member 204 within valve chamber, fluid control valve 200 can modulate a flow rate of the first fluid supply and/or the second fluid supply.

In some embodiments, valve body 202 may be configured to receive a fluid return at third port 210 (e.g., a return fluid output by fan coil unit 116). Valve body 202 may selectively deliver the fluid return to either first port 206 or second port 208 by rotating valve member 204.

In some embodiments, valve body 202 is a six-way valve body having six ports. A six-way valve body may combine two three-way valve bodies. For example, a second three-way valve body may be stacked above or below the three-way valve body shown in FIG. 2. A six-way valve body may be used to switch between both two fluid supplies and two fluid returns. The six-way valve body may use two separate valve members (e.g., for independently switching fluid supplies and fluid returns) or a shared valve member (e.g., for switching fluid supplies and fluid returns in unison). Advantageously, a six-way valve body may be controlled by a single actuator acting upon a single valve member. An exemplary six way valve body is described in greater detail with reference to FIG. 3.

In various embodiments, the plurality of ports 206-210 may include any number of ports (e.g., two ports, three ports, four ports, six ports, twenty ports, etc.). Ports 206-210 may be configured to connect to pipes, tubes, or other fluid control components. Ports 206-210 may be configured to connect with fluid pipelines using threading, compression fittings, glue, cement, flanges, welding, or other fasteners.

In some embodiments, the plurality of ports 206-210 are full size ports. A full size port may be defined as a port having a size that is greater than or equal to the size of the fluid pipeline connecting to the port. For example, if the pipeline connecting to a port has an internal diameter of two inches, the port may qualify as a full size port if the diameter of the port is at least two inches. In various embodiments, other size metrics (e.g., cross-sectional area, radius, circumference, etc.) may be used to quantify the size of fluid pipelines and/or ports. Advantageously, full size ports may result in improved flow rates (e.g., a higher maximum flow rate through valve 200), reduced friction losses, and reduced pressure drops relative to reduced size ports.

Valve body 202 may be made from any of a variety of materials including, for example, metals (e.g., cast iron, brass, bronze, steel, stainless steel, aluminum, etc.), plastics (e.g., PVC, PP, HDPE, etc.), glass-reinforced polymers (e.g., fiberglass), ceramics, or any combination thereof. The material or materials used to form valve body 202 may be based on the application for which valve body 202 is intended. For example, corrosion-resistant materials may be used for implementations in which valve body 202 is used with corrosive fluids (e.g., salt water, acidic fluids, etc.).

Still referring to FIG. 2, valve 200 is shown to include a valve member 204. In operation, valve member 204 may be located at least partially within the internal valve chamber. Valve member 204 may be controllably movable (e.g., in rotation, in linear movement, etc.) relative to valve body 202 to modulate fluid flow through valve 200. In some embodiments valve member 204 is configured to rotate by approximately 270 degrees relative to valve body 202. By rotating valve member 204, fluid flow can be selectively controlled (e.g., diverted, adjusted, increased, decreased, etc.) between the plurality of ports 206-210.

Valve member 204 is shown to include a disc 212 and a valve stem 214. In some embodiments, disc 212 is a substantially spherical ball and may characterize valve 200 as a ball valve. In other embodiments, disc 212 may be a cylinder (e.g., in a plug valve), a plate (e.g., in a butterfly valve), or have any other geometry or shape. Disc 212 may be located within valve 200 (e.g., within the internal valve chamber connecting ports 206-210) and may be controllably rotated to regulate fluid flow through valve 200.

In various embodiments, disc 212 may be fixedly attached to valve stem 214 or combined with valve stem 214 into a single component. Valve stem 214 may extend through valve body 202. (i.e., through hole 216) and connect to a handle or actuator for controlling the rotation of disc 212. In some embodiments, valve stem 214 connects multiple discs 212. For example, in a six-way valve, valve stem 214 may pass through valve body 202 and into another valve body. Valve stem 214 may be rotated (e.g., by a handle, by an automatic actuator, etc.) to adjust the rotational position of one or more discs 212.

Still referring to FIG. 2, disc 212 is shown to include a passage 218 therethrough. In some embodiments, passage 218 is L-shaped (e.g., having two openings and a single ninety degree bend). Passage 218 may be formed by drilling two bores into disc 212 at approximately 90 degrees relative to each other. The two bores may connect within disc 212 to form passage 218. In other embodiments, passage 218 may be T-shaped (e.g., having a main bore straight through disc 212 and a second bore extending perpendicularly from one side of the main bore), X-shaped (e.g., having two bores extending through disc 212 and intersecting at a ninety degree angle), or have any other shape.

Passage 218 may be controllably aligned (e.g., partially aligned, fully aligned, etc.) with ports 206-210 to form a fluid connection between pairs of ports. For example, passage 218 may be rotated into alignment with either first, port 206 and third port 210, or second port 208 and third port 210. A port may be characterized as open (e.g., partially open, fully open, etc.) if one of the openings 220 or 222 into passage 218 aligns (i.e., overlaps) at least partially with the port. Conversely, a port may be characterized as completely closed if none of the openings 220 or 222 into passage 218 align at least partially with the port.

In some embodiments, passage 218 is a full-bore passage. A full-bore passage may be defined as a passage having a size (e.g., diameter, radius, cross-sectional area, etc.) that is at least the same size as the pipeline connecting to valve 200. A full-bore passage provides several advantages over a reduced-bore passage (i.e., a passage in which the size of the passage is less than the size of the pipeline connecting to the valve). For example, a full-bore passage may not restrict flow, thereby resulting in an improved flow rate potential (e.g., a faster maximum flow rate) and lower friction losses relative to a reduced-bore passage. Advantageously, fluid control valve 200 may include both a plurality of full-size ports 206-210 and a full-bore passage 218 (without a corresponding increase in valve size).

In some embodiments, the bore size of passage 218 (e.g., bore diameter) may be sufficiently large to span a distance between the plurality of ports 206-210. A single opening into passage 218 (i.e., either opening 220 or opening 222) may be capable of simultaneously overlapping at least partially with two or more of ports 206-210. For example, in FIG. 2, valve member 204 is shown with passage 218 aligned with ports 206 and 210. If valve member 204 were rotated by 90 degrees to move passage 218 out of alignment with ports 206 and 210 and into alignment with ports 208 and 210 (i.e., 90 degrees counterclockwise from a top down perspective), valve member 204 would rotate through a position (e.g., approximately halfway through the 90 degree rotation) in which openings 220 and 222 would simultaneously overlap with all three ports 206-210. For example, opening 220 would simultaneously overlap with both ports 206 and 210 and opening 222 would simultaneously overlap with both ports 208 and 210.

A simultaneous overlap between all three ports 206-210 may cause mixing to occur. For example, if all three ports 206-210 were at least partially open simultaneously, fluid from port 206 could mix with fluid from port 208 within passage 218 and exit valve body 202 through port 210. Conventional three-way valves typically include reduced-size ports and/or a reduced-bore passage in order to prevent such a simultaneous overlap from occurring.

Advantageously, fluid control valve 200 can be operated to prevent fluid mixing from occurring without reducing the size of ports 206-210 or the size of passage 218. For example, rather than rotating valve member 204 by 90 degrees as described above, valve member 204 can be rotated by 270 degrees in the opposite direction (e.g., 270 degrees clockwise from a top down perspective). The 270 degree backward rotation results in valve member 204 ending in the same rotational position as if valve member 204 were rotated forward by 90 degrees. However, the 270 degree backward rotation does not cause valve member 204 to rotate through any position in which all three ports 206-210 are at least partially open simultaneously.

In some embodiments, mixing may occur between ports 206 and 208 when valve member 204 is rotated approximately half way through the 270 degree rotation (e.g., by approximately 135 degrees). However, at the 135 degree rotational position, port 210 is maintained completely closed and any mixed fluid is prevented from exiting valve body 202 via port 210. The window for mixing is very small (e.g., a small window around the 135 degree rotational position) compared to traditional three-way valves and does not occur during a flow modulation portion of the rotation (e.g., between 0 and 90 degrees or between 180 and 270 degrees). For implementations in which the pressures of the fluids at ports 206 and 208 are balanced, the opportunity for mixing is further minimized.

In FIG. 2, the primary components of valve 200 are shown (i.e., valve body 202 and valve member 204). In some embodiments, valve 200 includes one or more additional components not explicitly shown in FIG. 2. For example, valve 200 may include gaskets, O-rings, seals, or other types of packing to prevent fluid leakage. In some embodiments, valve 200 includes a soft seat (e.g., a fitting within valve body 202 made from a relatively soft material such as a plastics or elastomers) to interface between valve body 202 and valve member 204. In some embodiments, valve 200 includes a spring to bias valve member 204 toward a particular rotational position. Valve 200 may include any number or type of additional trim and/or packing components as may be suitable for various implementations. These or other additional components added to valve 200 may reduce or eliminate the opportunity for fluid mixing at the 135 degree rotational position.

Referring now to FIG. 3, a drawing of a six-way valve 300 is shown, according to an exemplary embodiment. Six-way valve 300 is shown to include a six-way valve body 302 and a valve member 304. Six-way valve body 302 may combine two three-way valve bodies (e.g., valve body 202) in a stacked orientation. In the stacked orientation, a single valve member 304 can be used to control fluid flow through both of the three-way valve bodies. Advantageously, six-way valve body 300 may be controlled by a single actuator acting upon valve member 304.

Six-way valve 300 may be used to switch between both two fluid supplies and two fluid returns. For example, six-way valve 300 may be configured to receive first fluid supply 102 at first supply port 306 and to receive second fluid supply 104 at second supply port 308. Valve member 304 may be rotated by 270 degrees to selectively control fluid flow from either first supply port 306 or second supply port 308 to outlet port 310 (e.g., without mixing). Outlet port 310 may connect to fan coil unit 116 (e.g., via coil supply line 114). The fluid from outlet port 310 may pass through fan coil unit 116 and return to valve 300 at inlet port 312. Valve member 304 may be rotated by 270 degrees to selectively divert fluid from inlet port 312 to either first return port 314 or second return port 316. Return ports 314 and 316 may be fluidly connected to returns 122 and 124, respectively.

Referring now to FIGS. 4-7, four cross-sectional drawings of a fluid control valve are shown, according to an exemplary embodiment. The cross-sectional drawings may be cross-sections of a three-way fluid control valve (e.g., valve 200, as shown) or cross-sections of a six-way fluid control valve (e.g., valve 300). FIGS. 4-7 illustrate valve 200 with valve member 204 at various stages of a 270 degree rotation. By rotating valve member 204 by approximately 270 degrees between a first end position (shown in FIG. 4) and a second end position (shown in FIG. 7), valve 200 can modulate the flow of a first fluid between ports 206 and 210 and the flow of a second fluid between ports 208 and 210.

In various embodiments, the first fluid and the second fluid are the same fluid (e.g., hot water and cold water, etc.) or different fluids (e.g., different types of coolant, different types of refrigerant, etc.). In other embodiments, port 210 receives a single fluid that is selectively diverted to either port 206 or port 208. As used herein, the term "first fluid" identifies a fluid flow between ports 206 and 210, and the term "second fluid" identifies a fluid flow between ports 208 and 210.

Figure 4:
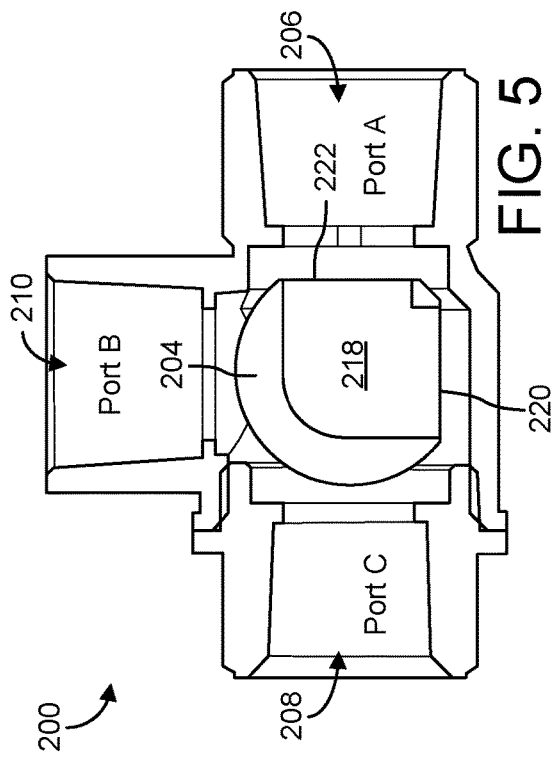
FIGS. 4-7 are cross-sectional drawings of the valve of FIG. 2, showing the valve member at various rotational positions of a 270 degree rotation, according to an exemplary embodiment.

Referring specifically to FIG. 4, valve member 204 is shown in a first end position. In the first end position, openings 220 and 222 into passage 218 may be completely aligned (i.e., at maximum overlap) with ports 206 and 210, respectively. In the first end position, ports 206 and 210 may be completely open and port 208 may be completely closed.

In the first end position, passage 218 forms a fluid connection between ports 206 and 210. The fluid connection between ports 206 and 210 allows a first fluid to flow therebetween (e.g., from port 206 to port 210 and/or from port 210 to port 206). When valve member 204 is in the first end position, the flow rate of the first fluid through valve body 202 may be at a maximum due to the maximum overlap of ports 206 and 210 with openings 220 and 222.

Figure 5:
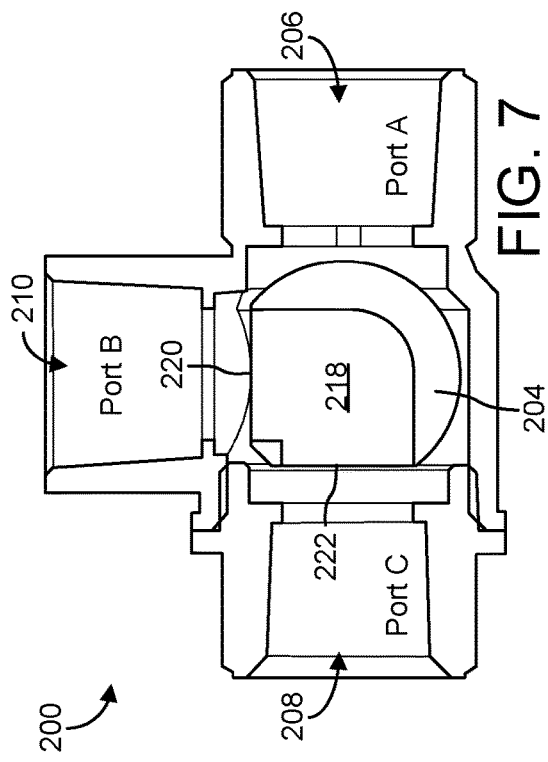

Referring now to FIG. 5, valve member 204 is shown in a first intermediate position. In some embodiments, the first intermediate position is approximately 90 degrees from the first end position (e.g., 90 degrees into the 270 degree rotation). Valve member 204 may be rotated into the first intermediate position by applying a torque to valve stem 214. For example, valve stem 214 may be attached to a user-operable handle or an automatic actuator (e.g., operable by a controller). The handle or actuator may be operated (i.e., rotated) to cause valve member 204 to rotate into the first intermediate position.

In the first intermediate position, opening 222 may be completely aligned with port 206 (i.e., at maximum overlap with port 206). However, as shown in FIG. 5, opening 220 may not be aligned completely or partially with any of ports 206-210. In the first intermediate position, port 206 may be completely open and ports 208-210 may be completely closed. When only one port is at least partially open, no flow occurs through valve body 202. Accordingly, no flow may occur through valve body 202 when valve member 204 is in the first intermediate position.

Valve 200 may be configured to modulate the flow rate of the first fluid (i.e., fluid flow between ports 206 and 210) by rotating valve member 204 between the first end position (shown in FIG. 4) and the first intermediate position (shown in FIG. 5). For example, when valve member 204 is rotated from the first end position into the first intermediate position (e.g., 90 degrees clockwise, from FIG. 4 to FIG. 5), the flow rate of the first fluid may be reduced from a maximum flow rate in the first end position to a zero flow rate in the first intermediate position. When valve member 204 is rotated from the first intermediate position into the first end position (e.g., 90 degrees counter-clockwise, from FIG. 5 to FIG. 4), the flow rate of the first fluid may be increased from a zero flow rate in the first intermediate position to a maximum flow rate in the first end position.

Advantageously, as valve member 204 is rotated between the first end position and the first intermediate position, port 208 may be maintained in a completely closed state. By maintaining port 208 in a completely closed state, the flow rate of the first fluid may be modulated (e.g., increased, decreased, adjusted, etc.) without forming a fluid connection between ports 208 and 210. The lack of a fluid connection between ports 208 and 210 prevents fluid flow between ports 208 and 210, thereby eliminating the potential for mixing.

Figure 6:
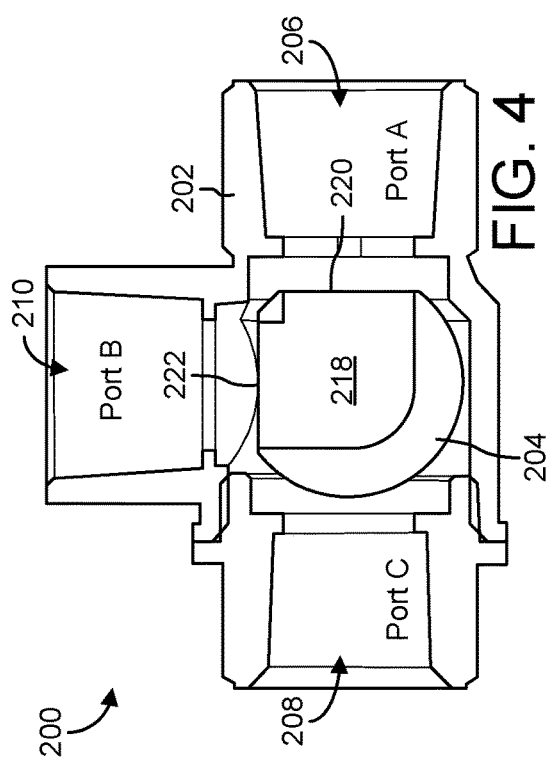

Referring now to FIG. 6, valve member 204 is shown in a second intermediate position. In some embodiments, the second intermediate position is approximately 90 degrees from the first intermediate position and approximately 180 degrees from the first end position. Valve member 204 may be rotated into the second intermediate position by continuing to rotate valve member 204 in the same direction (e.g., clockwise in FIGS. 4-7) by approximately 90 degrees past the first intermediate position.

In the second intermediate position, opening 220 may be completely aligned with port 208. However, as shown in FIG. 6, opening 222 may not be aligned completely or partially with any of ports 206-210. In the second intermediate position, port 208 may be completely open and ports 206 and 210 may be completely closed. Accordingly, no flow may occur through valve body 202 when valve member 204 is in the second intermediate position. In some embodiments, both ports 206 and 208 are at least partially open during a transition between the first intermediate position and the second intermediate position.

Advantageously, as valve member 204 is rotated between the first intermediate position (shown in FIG. 5) and the second intermediate position (shown in FIG. 6), port 210 may be maintained in a completely closed state. By maintaining port 210 in a completely closed state, fluid is prevented from exiting valve body 202 (e.g., for implementations in which ports 206 and 208 are connected to first fluid supply 102 and second fluid supply 104, respectively) or entering valve body 202 (e.g., for implementations in which ports 206 and 208 are connected to fluid returns 122 and 124, respectively). As valve member 204 is rotated between the first intermediate position and the second position, no flow may occur through valve body 202 via port 210.

Figure 7:
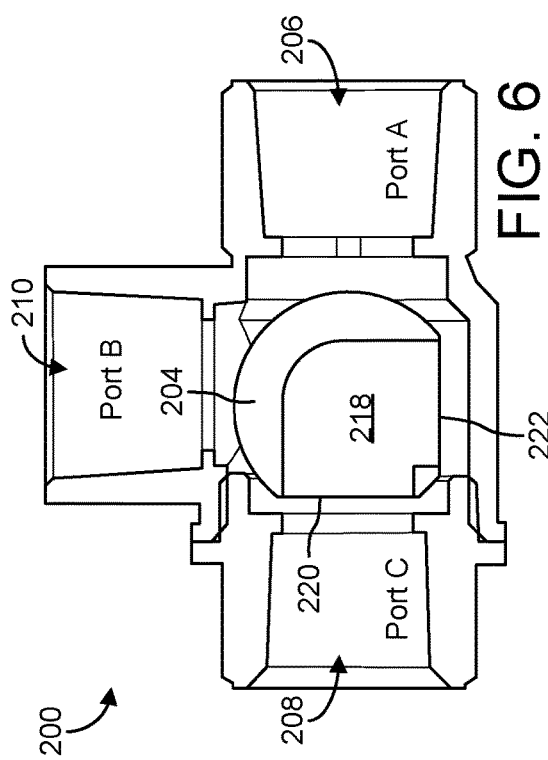

Referring now to FIG. 7, valve member 204 is shown in a second end position. In some embodiments, the second end position is approximately 90 degrees from the second intermediate position and approximately 270 degrees from the first end position. Valve member 204 may be rotated into the second end position by continuing to rotate valve member 204 in the same direction (e.g., clockwise in FIGS. 4-7) by approximately 90 degrees past the second intermediate position.

In the second end position, openings 220 and 222 into passage 218 may be completely aligned (i.e., at maximum overlap) with ports 210 and 208, respectively. In the second end position, ports 208 and 210 may be completely open and port 206 may be completely closed. In the second end position, passage 218 forms a fluid connection between ports 208 and 210. The fluid connection between ports 208 and 210 allows a second fluid to flow therebetween (e.g., from port 208 to port 210 and/or from port 210 to port 208). When valve member 204 is in the second end position, the flow rate of the second fluid through valve body 202 may be at a maximum due to the maximum overlap of ports 208 and 210 with openings 222 and 220, respectively.

Valve 200 may be configured to modulate the flow rate of the second fluid by rotating valve member 204 between the second end position and the second intermediate position. For example, when valve member 204 is rotated from the second intermediate position into the second end position (e.g., 90 degrees clockwise, from FIG. 6 to FIG. 7), the flow rate of the second fluid may be increased from a zero flow rate in the second intermediate position to a maximum flow rate in the second end position. When valve member 204 is rotated from the second end position into the second intermediate position (e.g., 90 degrees counter-clockwise, from FIG. 7 to FIG. 6), the flow rate of the first fluid may be decreased from a maximum flow rate in the second end position to a zero flow rate in the second intermediate position.

Advantageously, as valve member 204 is rotated between the second intermediate positions to the second end position, port 206 may be maintained in a completely closed state. By maintaining port 206 in a completely closed state, the flow rate of the second fluid may be modulated (e.g., increased, decreased, adjusted, etc.) without forming a fluid connection between ports 206 and 210. The lack of a fluid connection between ports 206 and 210 prevents fluid flow between ports 206 and 210, thereby eliminating the potential for mixing the first fluid and the second fluid.

In some embodiments, valve member 204 includes one or more stops defining a rotational range for valve member 204. The stops may permit valve member 204 to rotate only within a set rotational range. The ends of the rotational range may define the first end position and the second end position. In some embodiments, the stops are separated by approximately 270 degrees, thereby permitting valve member 204 to rotate by approximately 270 degrees between the first end position and the second position. In other embodiments, the first end position and the second end position may be separated by a greater or lesser number of degrees (e.g., 120 degrees, 180 degrees, 300 degrees, 315 degrees, etc.).

In some embodiments, valve member 204 does not include stops. Without stops, valve member 204 may be capable of rotating within valve body 202 by a full 360 degrees and/or indefinitely. In some embodiments, the rotational range for valve member 204 is defined by an external handle or actuator. For example, valve stem 214 may be connected to a user-operable handle (e.g., a lever, a wheel, etc.) for manually controlling the rotation of valve member 204 from outside valve body 202. The handle may include stops defining the rotational range of valve member 204.

In some embodiments, valve stem 214 is coupled to an actuator (e.g., actuator 112 or actuator 126) for automatically controlling the rotation of valve member 204. The actuator may be configured to rotate valve member 204 by approximately 270 degrees between the first end position and the second position. The actuator may be partially or completely automated and may be operated locally or remotely. In some embodiments, the actuator receives a control signal from a controller (e.g., controller 130) and operates valve 200 in response to the control signal received from the controller.

Figure 8:
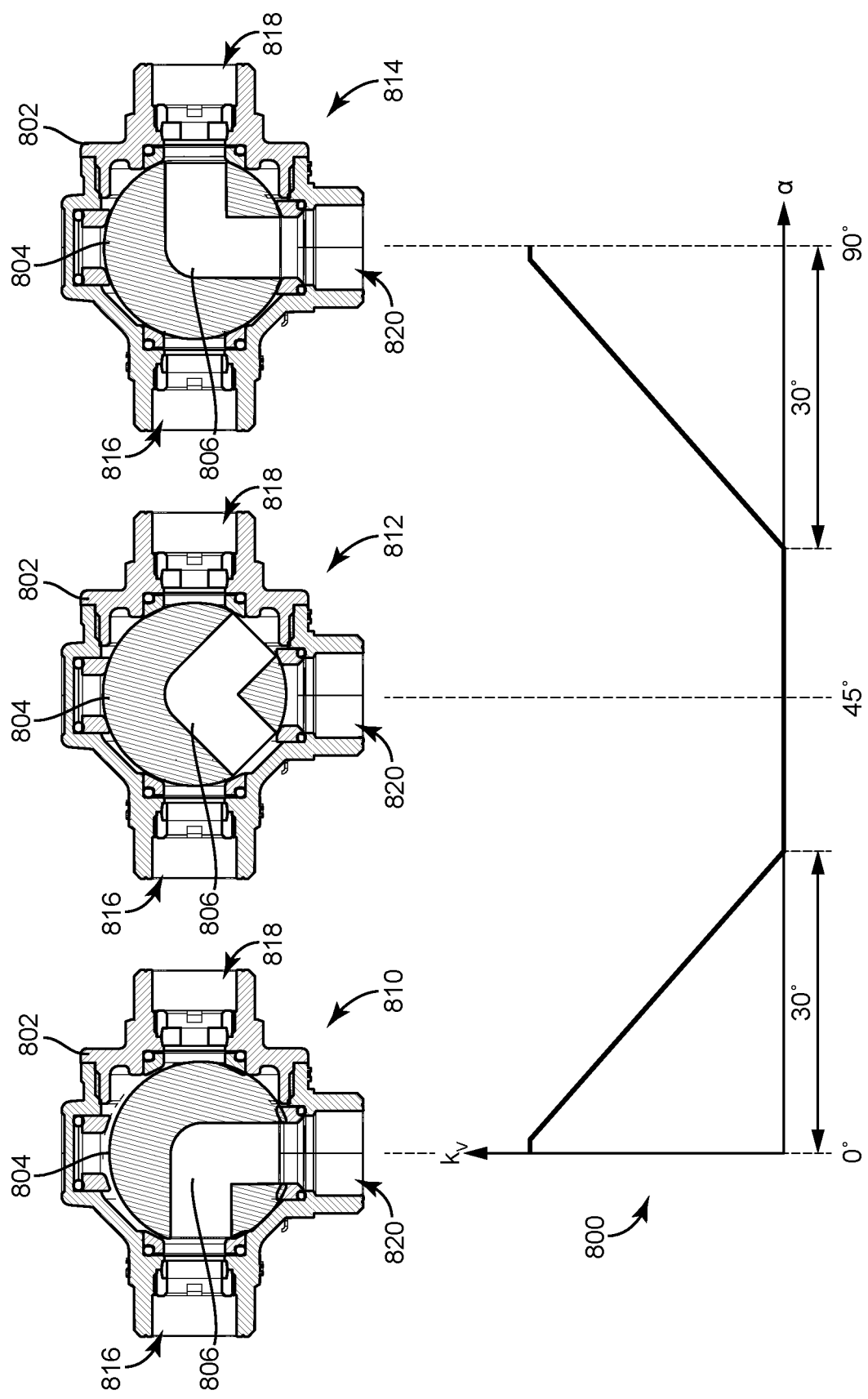
FIG. 8 is a flow diagram illustrating the flow control capability of a conventional valve assembly in which the valve member is rotated by only 90 degrees, according to an exemplary embodiment.
Figure 9:
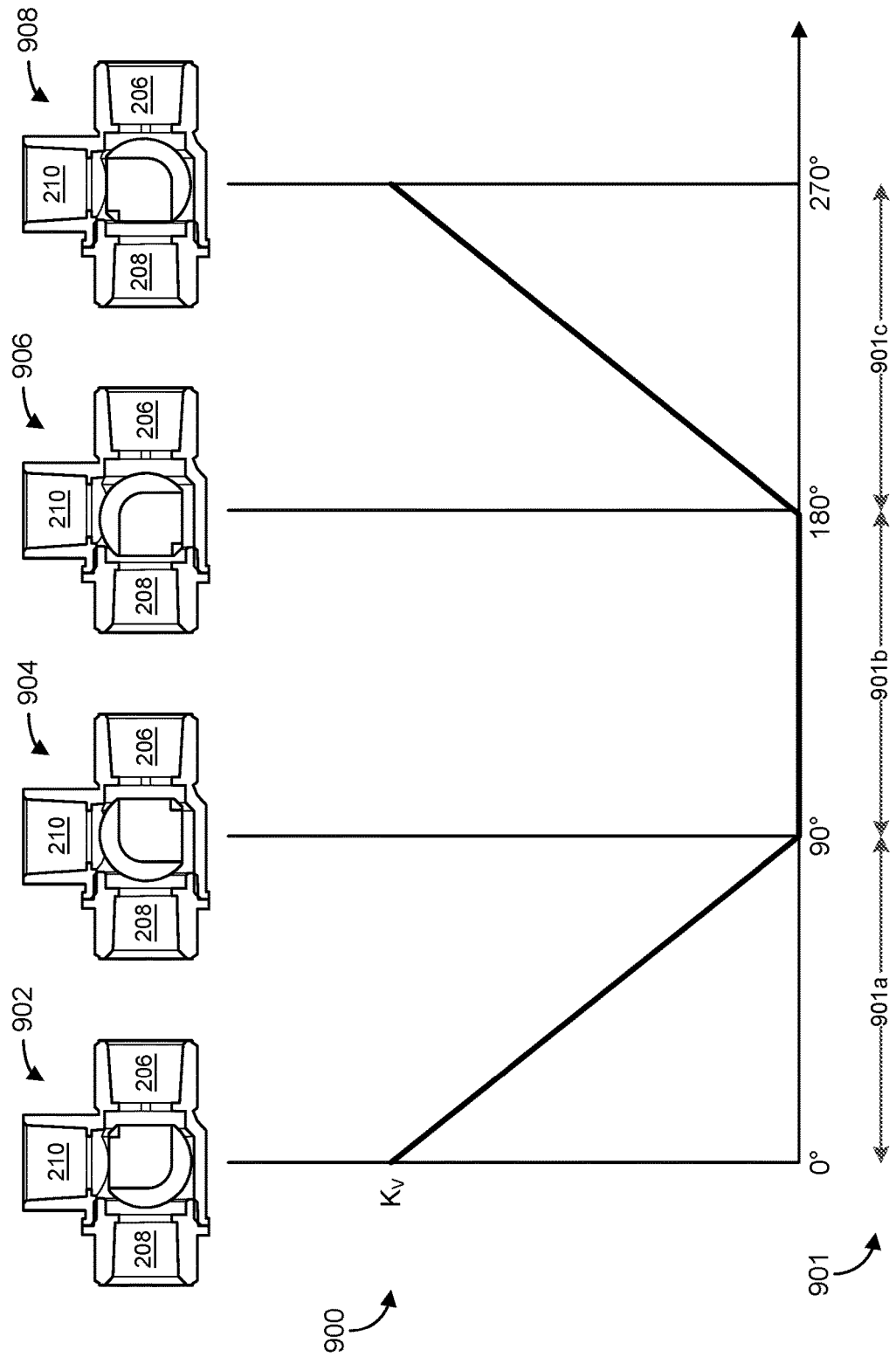
FIG. 9 is a flow diagram illustrating the improved flow control capability provided by the valve of FIG. 2 in which the valve member is rotated by 270 degrees, according to an exemplary embodiment.

Referring now to FIGS. 8-9 a pair of flow diagrams 800 and 900 are shown, according to an exemplary embodiment. Referring specifically to FIG. 8, flow diagram 800 illustrates the flow control ability of a conventional fluid control valve 802. Valve 802 is operated by rotating valve member 804 by 90 degrees between a first end position 810 and a second end position 814.

In order to prevent mixing from occurring, passage 806 through valve member 804 has a reduced bore size relative to the size of the fluid pipelines connecting to valve 802. The reduced bore size prevents fluid mixing when valve member 804 is in an intermediate position 812 between first end position 810 and second end position 814. However, the reduced bore size increases friction losses and requires a greater upstream pressure to cause fluid flow through valve 802.

Still referring to FIG. 8, fluid flow through valve 802 can be controlled by rotating valve member 804 by a total of 90 degrees. Fluid flow between ports 816 and 820 is controlled by rotating valve member 804 approximately 30 degrees from first end position 810 toward intermediate position 812. Fluid flow between ports 818 and 820 is controlled by rotating valve member 804 by approximately 30 degrees from second end position 814. With valve 802, fluid flow can be adjusted between a maximum flow rate (i.e., at end positions 810 and 814) and a zero flow rate, by rotating valve member 804 by 30 degrees. The 30 degree separation between maximum and minimum flow causes a relatively small rotation of valve member 804 to result in a relatively large change in flow rate. It may be difficult to achieve a desired flow rate with valve 802 due to the relatively large change in flow rate resulting from a small rotation of valve member 804.

Referring specifically to FIG. 9, flow diagram 900 illustrates the improved flow control ability provided by fluid control valve 200. Valve 200 is operated by rotating valve member 204 by 270 degrees between a first end position 902 and a second end position 908. First end position 902 may correspond to the position shown in FIG. 4 and second end position 908 may correspond to the position shown in FIG. 7. Fluid flow between ports 206 and 210 can be controlled by rotating valve member 204 by approximately 90 degrees between first end position 902 and first intermediate position 904. First intermediate position 904 may correspond to the position shown in FIG. 5. Fluid flow between ports 208 and 210 can be controlled by rotating valve member 204 by approximately 90 degrees between second end position 908 and second intermediate position 906. Second intermediate position 906 may correspond to the position shown in FIG. 6.

As illustrated by the diagram 900 of FIG. 9, as valve 200 is rotated from the first end position 902 to the second end position 908 along a travel path 901 of the valve 200, the valve member 204 is first rotated through a first travel path portion 901*a* in which the valve 200 controls flow between the first port 206 and the third port 210. In particular, as the valve 200 is rotated from the beginning of the first travel path portion 901*a* (and corresponding beginning of the travel path 901), the first port 206 transitions from a fully open configuration (i.e. max/full flow configuration) at the first end of the first travel path portion 901*a* to fully closed configuration (i.e. a zero/no-flow configuration) upon reaching the first intermediate position 904 (which defines the second end of the first travel path portion 901*a*). As the valve 200 continues to be rotated and travel along the travel path 901, the valve 200 enters the second travel path portion 901*b*. As shown by the flow diagram 900, as the valve 200 travels through this middle, no-flow portion of the travel path 901, no fluid connection is provided between any of the ports 206, 208, 210.

Upon being rotated through the second travel path portion 901*b* and reaching the second intermediate position 906, continued rotation of the valve 200 moves the valve 200 through the third travel path portion 901*c* in which the valve 200 controls flow between the second port 208 and a third port 210. In particular, as rotation of the valve 200 brings the valve 200 into the third travel path portion 901*c*, the second portion 208 transitions between a fully closed configuration (i.e. a zero/no-flow configuration), to a fully open configuration (i.e. a max/full flow configuration) upon the valve 200 reaching the end of the third travel path portion 901*c* (and corresponding end of the travel path 901).

As also illustrated by the flow diagram 900 of FIG. 9, the configuration of the valve 200 defines a travel path 901 in which each of a clockwise (CW) rotation of the valve 200 as well as a counterclockwise (CCW) rotation of the valve 200 allow the valve 200 to reach a no-flow valve 200 orientation from an initial flow orientation of the valve 200. For example, when operating the valve 200 to control flow between the first port 206 and the third port 210, the valve 200 may be rotated in a CW direction to bring the valve 200 to a no-flow orientation, whereas when operating the valve 200 to control flow between the second port 208 and the third port 210, the valve 200 may be rotated in a CCW direction to bring the valve 200 to a no-flow orientation. The configuration of the valve 200 also defines a travel path 901 in which a full/max flow orientation of the valve 200 may be reached from an initial no-flow orientation of the valve 200 by rotating the valve 200 in either the CW or CCW directions. In particular, when in an initial no-flow orientation (e.g., when the valve 200 has a rotational orientation defined anywhere along the second travel path portion 901*b*), full/max flow between the first port 206 and the third port 210 may be attained by rotating the valve 200 in a CCW direction relative to the initial no-flow orientation, while a fill-max flow between the second port 208 and the third port 210 may be attained by rotating the valve 200 in a CW direction relative to the initial no-flow orientation.

Advantageously, the 90 degree separation between maximum flow rate (i.e., at end positions 902 and 908) and zero flow (i.e., at intermediate positions 904 and 906) allows for a more gradual change in flow rate, relative to conventional valve 802. It may be easier to achieve a desired flow rate with valve 200 due to the relatively large separation (e.g., 90 degrees) between maximum and minimum flow. With valve 200, a desired flow rate can be achieved more accurately and precisely than with conventional valve 802. For example, a control system for valve 200 can tolerate a greater variation in actuator position while maintaining the flow rate through valve 200 within an acceptable (e.g., setpoint) range. This greater tolerance in actuator position allows less accurate and less expensive actuators to be used without sacrificing flow control precision.

Figure 10:
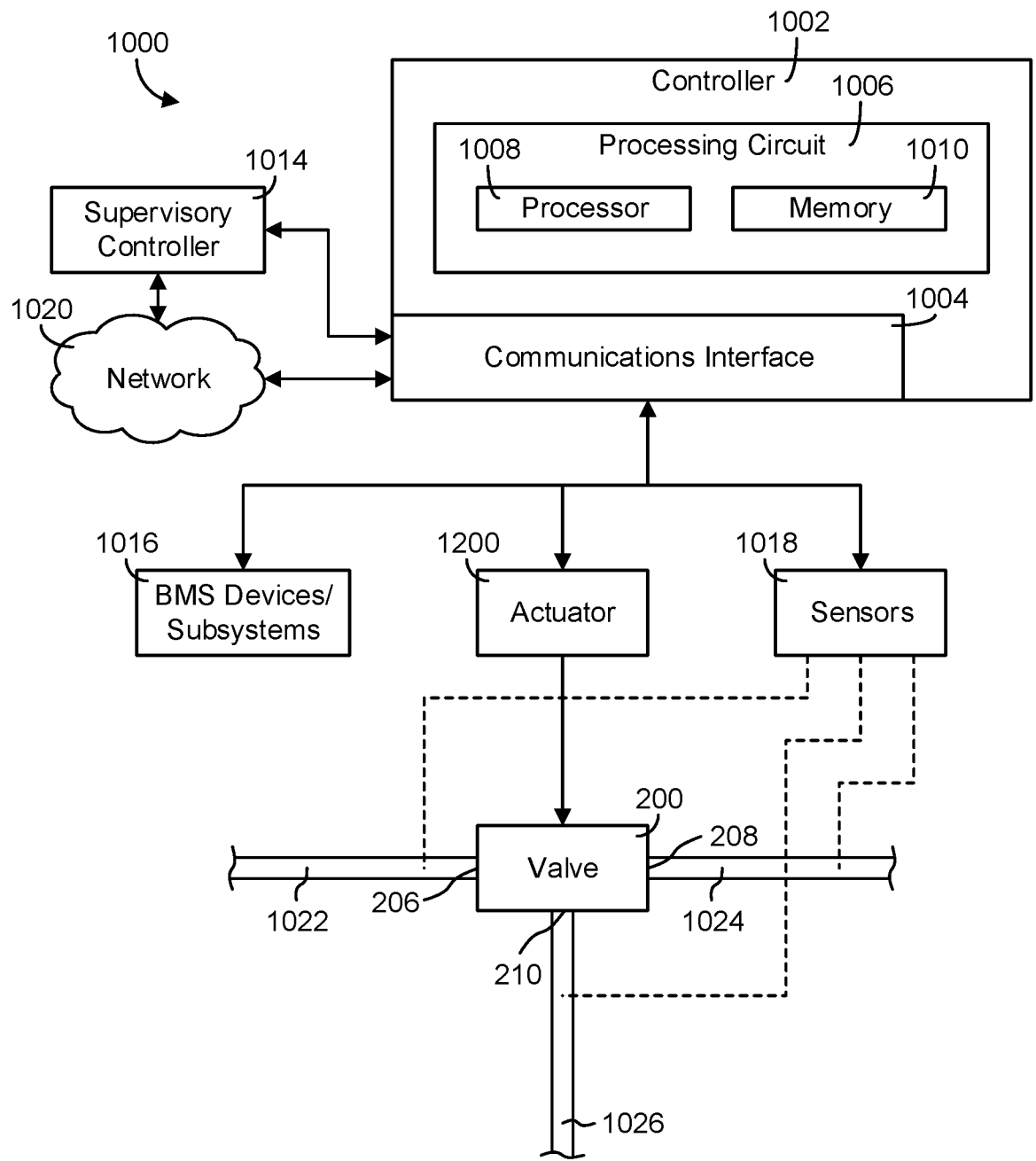
FIG. 10 is a block diagram of a control system configured to operate the valve of FIG. 2, according to an exemplary embodiment.

Referring now to FIG. 10, a block diagram of a control system 1000 is shown, according to an exemplary embodiment. Control system 1000 may be used to monitor and control any number of conditions, states, or variables of a controlled system (e.g., a building system, a plumbing system, a HVAC system, etc.) including, for example, the rotational position of fluid control valve 200.

In some embodiments, control system 1000 is a local control system (e.g., local to a building, building zone, building system, etc.). In other embodiments, control system 1000 is a distributed or remote control system. Control system 1000 may be used to control a single device (e.g., valve 200) or a plurality of devices (e.g., a chiller, boiler, air handling unit, damper, etc.). The plurality of devices may be located within a single building or building system or spread throughout several buildings or discrete building systems. In some embodiments, control system 1000 is part of a comprehensive building automation system such as a META-SYS® brand building automation system sold by Johnson Controls, Inc. In other embodiments, control system 1000 is a local control system for one or more valves and/or other HVAC devices.

Control system 1000 is shown to include a controller 1002 having a communications interface 1004 and a processing circuit 1006. Communications interface 1004 may include wired or wireless interfaces (e.g., jacks, antennas, transmitters, receivers, transceivers, wire terminals, etc.) for conducting data communications with, for example, actuator 1200, supervisory controller 1014, BMS devices/subsystems 1016, sensors 1018, or other external devices or data sources. Data communications may be conducted via a direct connection (e.g., a wired connection, an ad-hoc wireless connection, etc.) or via a communications network 1020 (e.g., an Internet connection, a LAN, WAN, or WLAN connection, etc.).

Communications interface 1004 may be configured to receive control signals from a supervisory controller 1014 (e.g., specific operating instructions, setpoint instructions, etc.), measurement signals from sensors 1018, and/or other types of electronic data communications from various building management system (BMS) devices or subsystems 1016. For example, communications interface 1004 may receive measurement signals from sensors 1018 indicating a state or condition (e.g., temperature, pressure, flow rate, etc.) of the fluids in pipelines 1022-1026. As shown in FIG. 10, pipelines 1022, 1024, and 1026 may connect to ports 206, 208, and 210, respectively.

Still referring to FIG. 10, controller 1002 is shown to include a processing circuit 1006 having a processor 1008 and memory 1010. Processor 1008 can be implemented as a general purpose processor, an application specific integrated circuit (ASIC), one or more field programmable gate arrays (FPGAs), a group of processing components, or other suitable electronic processing components.

Memory 1010 (e.g., memory device, memory unit, storage device, etc.) may include one or more devices (e.g., RAM, ROM, Flash memory, hard disk storage, etc.) for storing data and/or computer code for completing or facilitating the various processes, layers and modules described herein. Memory 1010 may include volatile memory or non-volatile memory. Memory 1010 may include database components, object code components, script components, or any other type of information structure for supporting the various activities and information structures described herein.

In some embodiments, controller 1002 is a feedback loop controller (e.g., a proportional gain controller, a proportional-integral (PI) controller, a proportional-integral-derivative (PID) controller, and adaptive gain controller, a pattern recognition adaptive controller (PRAC), a model predictive controller, etc.) Controller 1002 may be configured to monitor the fluids in pipelines 1022-1026 (e.g., using measurement signals received from sensors 1018). Controller 1002 may use the signals from sensors 1018 to operate fluid control valve 200 and to achieve a desired setpoint. For example, controller 1002 may be configured to operate fluid control valve 200 to achieve a temperature setpoint, a pressure setpoint, a flow rate setpoint, or any other type of setpoint received from supervisory controller 1014 or from a user device (e.g., via network 1020).

Controller 1002 may be configured to automatically operate fluid control valve 200 using an actuator 1200 rotatably coupled to valve stem 214 and configured to cause valve member 204 to rotate (e.g., by acting upon valve stem 214). Actuator 1200 may be any type of mechanism capable of acting upon valve 200 to cause a rotation of the valve member 204. For example, actuator 1200 may include an electric motor that is operable in response to a control signal from controller 1002 to cause a rotation of valve member 204. Actuator 1200 may be used as one or both of actuators 112 and 126 shown in FIG. 1. Additionally, actuator 1200 may be used to control either a single valve 200 (such as, e.g. shown in FIG. 2) or a stacked valve 300 (such as, e.g. shown in FIG. 3).

Figure 11:
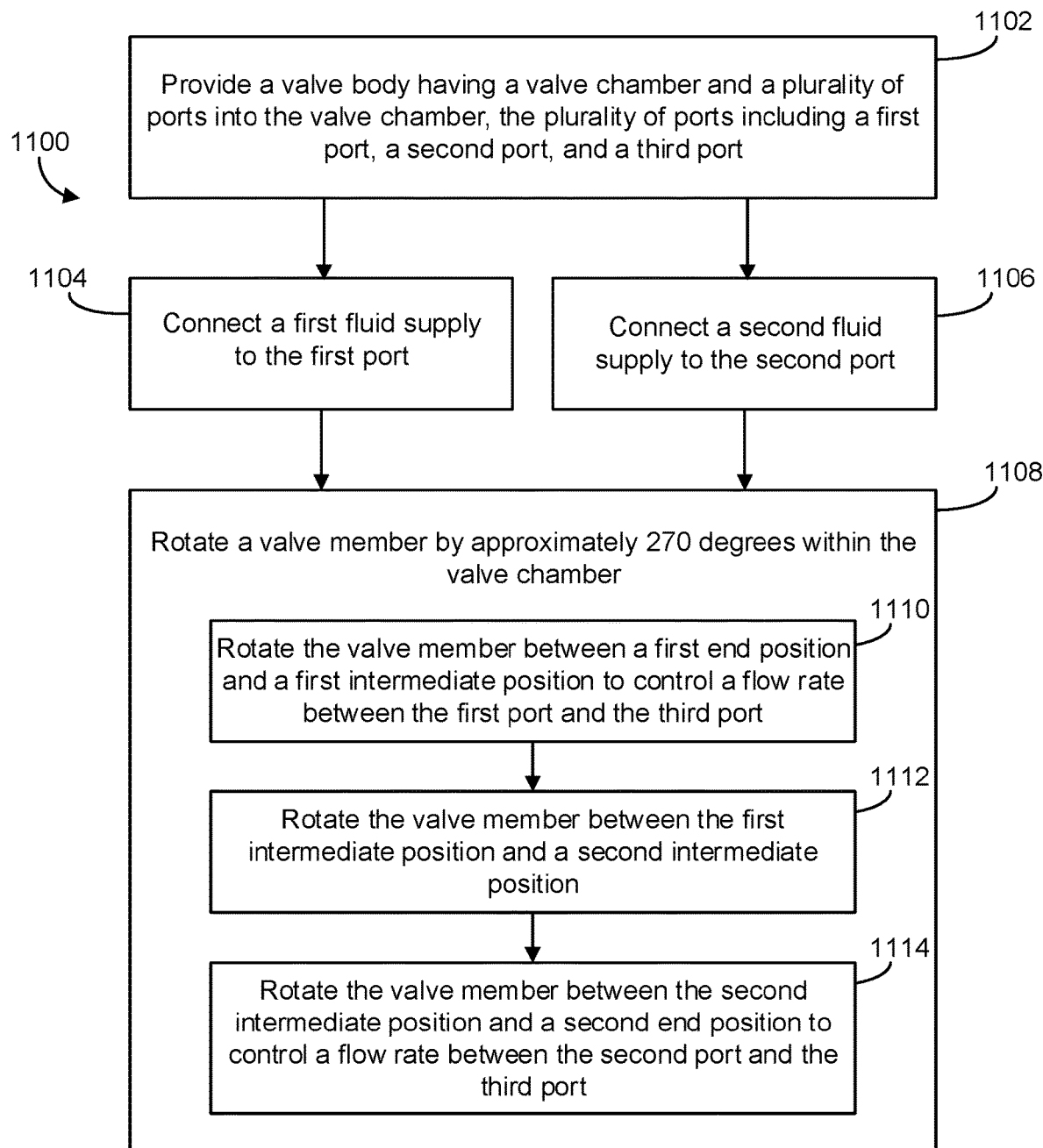
FIG. 11 is a flow chart of a process for controlling fluid flow, according to an exemplary embodiment.

Referring now to FIG. 11, a flowchart of one embodiment of a process 1100 for controlling fluid flow is shown, according to an exemplary embodiment. In some embodiments, process 1100 is performed by control system 1000 using controller 1002, actuator 1200, and/or fluid control valve 200 as described herein.

Process 1100 is shown to include the step 1102 of providing a valve comprising a valve body defining a valve chamber and a plurality of ports into the valve chamber. According to various embodiments, the valve may be a three-way valve (such as, e.g. valve 200 of FIG. 2), a six-way valve (such as, e.g., valve 300 of FIG. 3), or may define any other number of ports. In some embodiments, the plurality of ports may include a first port, a second port, and a third port, with the first port and the second port being aligned with a common axis and located on opposite sides of the valve chamber. In some embodiments, the third port is aligned with a second axis substantially perpendicular to the common axis. In some embodiments, the plurality of ports are full-size ports. For example, each of the plurality of ports may have a size (e.g., an area, a diameter, a radius, etc.) greater than or equal to the size of the fluid pipeline connecting to the port (i.e., a "full size" port).

Still referring to FIG. 11, process 1100 is shown to include at step 1104 fluidly connecting a first port of the valve body to a first fluid supply and at step 1106 fluidly connecting a second port of the valve body to a second fluid supply.

At step 1108, the valve member is rotated by approximately 270 degrees within the valve chamber. In some embodiments, the valve member is configured to rotate about an axis of rotation substantially perpendicular to both the common axis and the second axis. In some embodiments, the valve member includes a spherical disc component (i.e., a ball). In some embodiments, the valve may be a valve 200 having a valve member 204 as shown in FIG. 2.

The valve member may include an L-shaped fluid passage extending through the ball. The fluid passage may be formed by drilling two bores in the ball at 90 degrees relative to each other. The two bores may meet in the middle of the ball to form the fluid passage. In some embodiments, the bore size of the fluid passage (e.g., bore diameter, bore area, etc.) may be sufficiently large to span a distance between the plurality of ports. For example, a single opening into the fluid passage may be large enough to simultaneously overlap with two or more of the plurality of ports. In some embodiments, the passage is a full-bore fluid passage having a bore size (e.g., bore diameter, bore cross-sectional area, etc.) greater than or equal to the size of the fluid pipelines connecting to the valve body.

In some embodiments, the valve member is rotatably coupled to an actuator. In such embodiments, the actuator may be configured to perform step 1108 automatically in response to a control signal from a controller. The actuator may be designed to control the rotation of the valve member throughout the entire 270 degree rotational range. Conventional actuators typically rotate only 90 degrees and may require modification to be capable of performing step 1108. In some embodiments, the actuator is a specially designed actuator, customized to rotate 270 degrees, such as, e.g., actuator 1200 described herein.

Rotating the valve member by 270 degrees in step 1108 may allow the controller to independently modulate the flow rates of a first fluid (i.e., between the first port and the third port) and of a second fluid (i.e., between the second port and the third port). For example, modulating fluid flow between the first port and the third port may include regulating a flow rate of a first fluid supply to the third port. Modulating fluid flow between the second port and the third port may include regulating a flow rate of the second fluid supply to the third port.

In some embodiments, step 1108 includes rotating the valve member between a first end position in which the first port is fluidly connected with the third port and the second port is closed, and a second end position in which the second port is fluidly connected with the third port and the first port is closed. Rotating the valve member by approximately 270 degrees between the first end position and the second end position may include rotating the valve member through a first intermediate position approximately 90 degrees from the first end position and a second intermediate position approximately 90 degrees from the second end position. In some embodiments, when the valve member is in the first intermediate position and the second intermediate position, none of the plurality of ports are fluidly connected with one another.

Still referring to FIG. 11, step 1108 is shown to include a plurality of sub-steps 1110-1114. Each of sub-steps 1110-1114 corresponds to a rotation of the valve member between different portions of the 270 degree rotation travel path of the valve member. For example, sub-step 1110 is shown to include rotating the valve member between the first end position and the first intermediate position to control a flow rate between the first port and the third port. In some embodiments, sub-step 1110 is performed while maintaining the second port completely closed. Sub-step 1110 may correspond to a first 90 degrees of the 270 degree rotational travel path of the valve member, such as, e.g., representatively illustrated by the transition from the position shown in FIG. 4 to the position shown in FIG. 5. In sub-step 1110, the valve member may be rotated by approximately 90 degrees to transition between a maximum flow rate of the first fluid (e.g., in the first end position) and a zero flow rate of the first fluid (e.g., in the first intermediate position).

Step 1108 is shown to further include the sub-step 1112 of rotating the valve member between the first intermediate position and the second intermediate position. In some embodiments, sub-step 1112 is performed while maintaining the third port completely closed. Sub-step 1112 may correspond to a second 90 degrees of the 270 degree rotation, such as, e.g., representatively illustrated by the transition from the position shown in FIG. 5 to the position shown in FIG. 6. Throughout sub-step 1112, no flow may occur through the valve body through the third port. Although both the first port and the second port may be at least partially open at rotational position approximately half way between the first end position and the second end position (e.g., approximately 135 degrees through the 270 degree rotation), the third port is maintained in a completely closed state, preventing fluid flow therethrough.

Step 1108 is shown to further include the sub-step 1114 of rotating the valve member between the second intermediate position and the second end position to control a flow rate between the second port and the third port. In some embodiments, sub-step 1114 is performed while maintaining the first port completely closed. Sub-step 1114 may correspond to a third 90 degree rotation of the 270 degree rotation, such as, e.g., representatively illustrated by the transition from the position shown in FIG. 6 to the position shown in FIG. 7. In sub-step 1114, the valve member may be rotated by approximately 90 degrees to transition between a maximum flow rate of the second fluid (e.g., in the second end position) and a zero flow rate of the second fluid (e.g., in the second intermediate position).

Advantageously, regulating the flow rates during step 1108 may occur without mixing the first fluid and the second fluid. For example, the flow rate of the first fluid may be regulated by rotating the valve member between the first end position (i.e., a maximum flow position for the first fluid) and the first intermediate portion (i.e., a zero flow position) while maintaining the flow rate of the second fluid supply at zero flow. The flow rate of the second fluid may be regulated by rotating the valve member between the second end position (i.e., a maximum flow position for the second fluid) and the second intermediate portion (i.e., a zero flow position) while maintaining the flow rate of the first fluid at zero flow.

The 270 degree rotation allows the flow rates for both the first fluid and the second fluid to be controlled throughout discrete 90 degree portions of the total 270 degree rotational range. By using a full 90 degrees to transition from maximum flow to minimum flow, the flow rates of the first and second fluid can be controlled more accurately and precisely than with traditional flow control valves and/or control processes.

The first port and the second port may be disposed at approximately equal distances and/or angles relative to the third port. For example, the first port and the second port may both be oriented at the same or approximately the same angle relative to the third port (e.g., 45 degrees, 60 degrees, 90 degrees, 120 degrees, etc.). The first port may be oriented at a particular angle relative to the third port in a first direction about an axis of rotation. The second port may be oriented at the same or approximately the same angle relative to the third port, but in a second direction about the axis of rotation opposite the first direction. The third port may be equidistant from the first port and the second port.

The valve member may be configured to rotate within the valve chamber to modulate fluid flow between the first port and the third port while maintaining the second port completely closed and to modulate fluid flow between the second port and the third port while maintaining the first port completely closed. The valve member may be configured to rotate by an amount approximately equal to a complete rotation less the angular difference in orientation between the third port and either the first port or the second port. For example, if the first port (or the second port) is oriented at approximately 90 degrees relative to the third port, the valve member may be configured to rotate by approximately 270 degrees (i.e., 360 degrees–90 degrees=270 degrees). If the first port (or the second port) is oriented at approximately 120 degrees relative to the third port, the valve member may be configured to rotate by approximately 240 degrees (i.e., 360 degrees–120 degrees=240 degrees). Rotating the valve member may regulate a flow rate of a first fluid supply from the first port to the third port and a flow rate of a second fluid supply from the second port to the third port without mixing the first fluid supply and the second fluid supply.

The controller may be configured to cause rotation of the valve member by a complete rotation, less the angle of the angled passage. For example, if the angled passage has a 90 degree angle, the controller may cause rotation of the valve member by 270 degrees (i.e., 360 degrees–90 degrees=270 degrees). If the angled passage has a 120 degree angle, the controller may cause rotation of the valve member by 240 degrees (i.e., 360 degrees–120 degrees=240 degrees).

The controller may be configured to rotate the valve member between a first position and a second position. The valve member can be rotated in either a first direction by a first number of degrees (e.g., 90 degrees, 120 degrees, etc.) to transition between the first position and the second position or in a second direction by a second number of degrees (e.g., 270 degrees, 240 degrees, etc.) to transition between the first position and the second position. The first number of degrees and the second number of degrees may sum to 360 degrees. The controller may be configured to rotate the valve member by the greater of the first number of degrees and the second number of degrees to transition between the first position and the second position.

Figure 12:
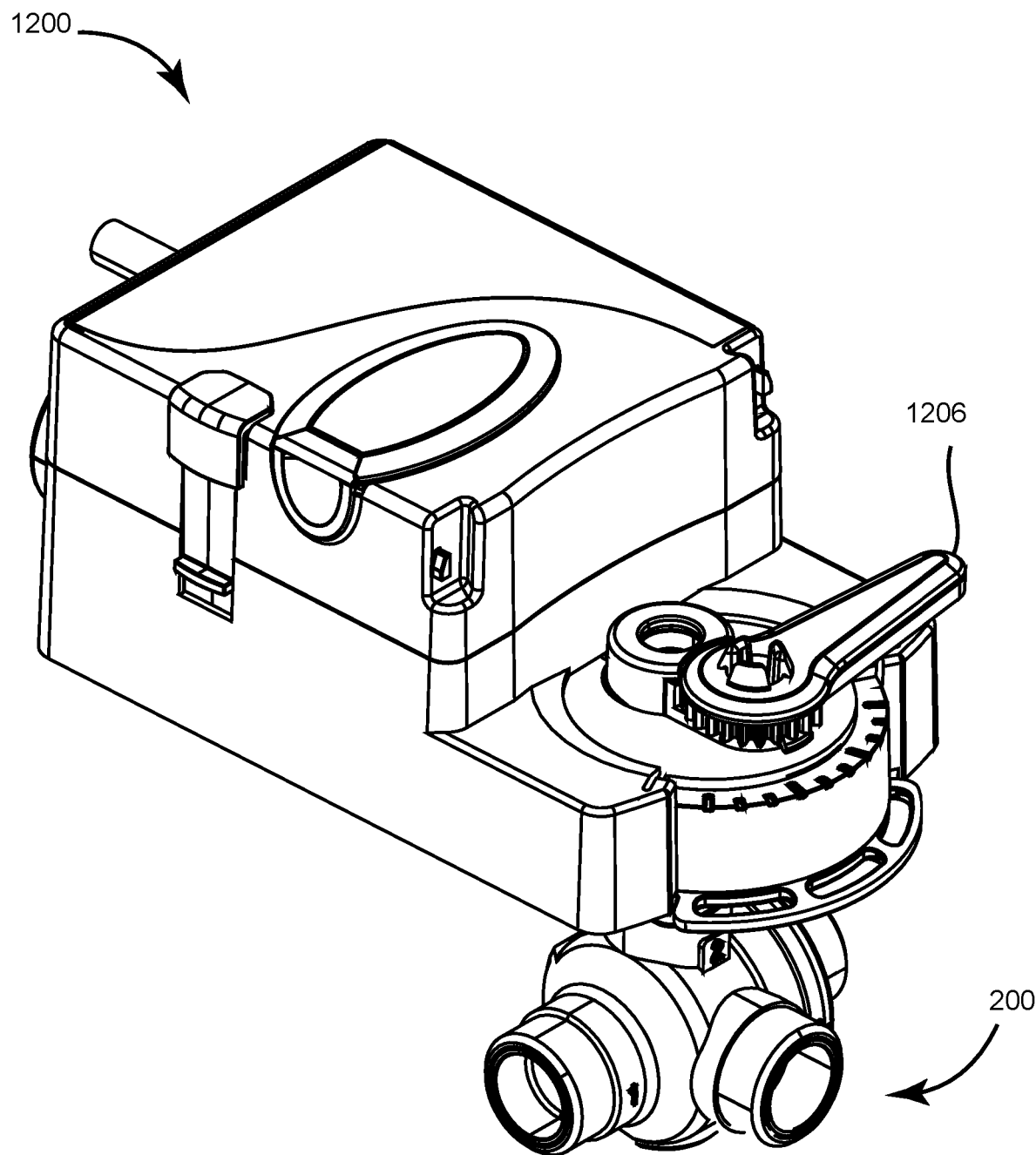
FIG. 12 is a perspective view drawing of an actuator coupled to the valve of FIG. 2, according to an exemplary embodiment.

Referring to FIG. 12, one embodiment of an actuator 1200 that may be used to controllably rotate the valve member 204 of a valve 200 according to any of the valve embodiments described herein (including, e.g., valves 110 and 120 of FIG. 1, valve 200 of FIG. 2, valve 300 of FIG. 3, etc.) by approximately 270 degrees is illustrated. As will be understood, however, the actuator 1200 of FIG. 12 may also be used with any number of different valve arrangements, including, e.g., valve arrangements having travel path ranges different than the approximately 270 degree range of the valve 200 described herein.

As illustrated by the embodiment of actuator 1200 of FIG. 12, a valve handle 1206 installed on the actuator 1200 may indicate the current position of the valve member 204. As depicted, the valve handle 1206 indicates which valve inlet, if any, is open to receive a fluid supply. In some embodiments, the valve handle 1206 also doubles as a manual override handle that may be used to move the drive shaft and valve position when power is not supplied to the actuator 1200, such as during an installation process or during a troubleshooting procedure.

Figure 14:
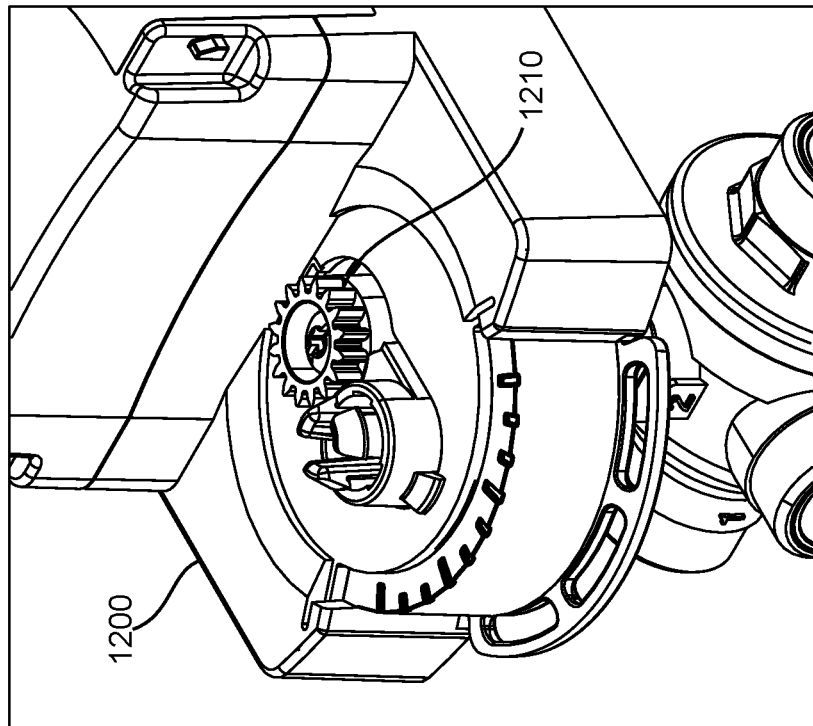
FIG. 14 is a perspective view drawing of the geared drive shaft of an actuator coupled to the valve of FIG. 2, according to an exemplary embodiment.
Figure 13:
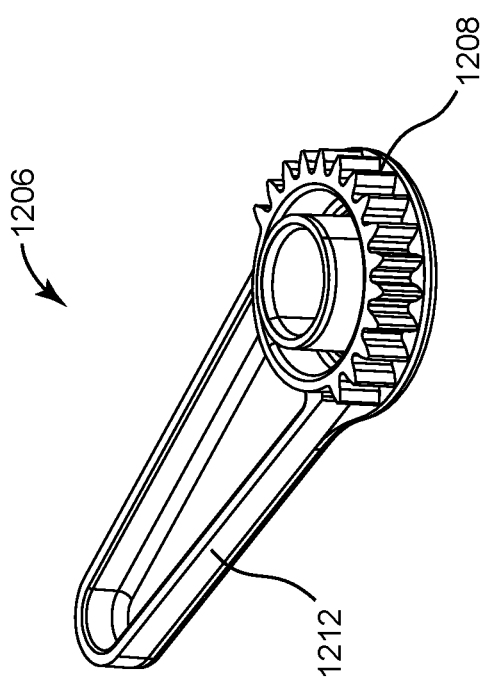
FIG. 13 is a perspective view drawing of a manual override handle, according to an exemplary embodiment.

Owing to the unique nature of a 270 degree valve 200, rotation of the valve handle 1206 and the valve stem 214 about the same axis of rotation and in the same direction as the valve stem 214 may be difficult to implement, as, due to a lack of clearance in the area in which the handle 1206 is installed on the actuator 1200, either the handle lever arm would be too short to be useable or the shaft of the handle 1206 would need to be excessively long to bring the handle 1206 above the highest point of the actuator 1200 in the travel path of the handle 1206. Accordingly, to overcome these issues, as depicted in FIGS. 12 and 13, the valve handle 1206 may include a set of handle gear teeth 1208 at a ratio of 2:3 with respect to the actuator gear teeth 1210 located on the output shaft of the actuator 1200. This gear ratio allows the handle 1206 to rotate 180 degrees while the output shaft rotates 270 degrees about a common axis of rotation but in the opposite direction, permitting the valve member 204 to travel its entire range of motion (i.e. along travel path 901) switching from port 206 and port 210 being fully open to port 208 and port 210 being fully open, and vice versa. Specifically referring to FIG. 13, the pointer handle 1206 (shown upside-down relative to its installation orientation) has a ledge 1212 to stop dust and debris from settling in the gearing mechanism when mounted upright. The handle 1206 mates with actuator gear teeth 1210 on the output shaft of the actuator 1200, specifically depicted in FIG. 14. In some embodiments, the handle gear teeth 1208 and the actuator gear teeth 1210 are complete spur gears, with a tooth 1210 count of twenty-four (for the shaft) and sixteen (for the handle 1206), resulting in the gear ratio stated above.

As described above, and as illustrated by FIG. 9, according to various embodiments a valve 200 with which the actuator 1200 may be used may define a travel path 901 in which a valve member 204 orientation corresponding to a fully open configuration of the first port 206 defines a first end of the travel path 901 and a valve member 204 orientation corresponding to a fully open configuration of the second port 208 defines a second end of the travel path 901. As the valve member 204 travels along the travel path 901 between the first end and the second end, the valve member 204 initially travels along a first travel path portion 901a. As the valve member 204 travels through the first travel path portion 901a, the degree to which the first port 206 is open decreases proportionally from the fully open first port 206 configuration defined at the first end of the first travel path portion 901a to a fully closed configuration of the first port 206 at the end of the first travel path portion 901a. Upon travelling through the first travel path portion 901a, the valve member 204 travels/rotates through additional no-flow orientations (in which each of the first port 206 and second port 208 are fully closed) as the valve member 204 is moved through the second travel path portion 901b. Upon exiting the second travel path portion 901b, the valve member 204 begins travelling through a third travel path portion 901c, along which the degree to which the second port 208 is open begins to increase from an initial no-flow, fully closed configuration of the second port 208. As the valve member 204 is rotated through the third travel path portion 901c, the degree to which the second port 208 is open continues to increase proportionally until the valve member 204 reaches the second end of the travel path 901, at which the second port 208 is defined by a fully open configuration.

Although the travel path 901 of the valve 200 has been described as defining a 270 degree travel path, according to other embodiments, the travel path may be defined by any other desired travel path rotational range of less than or equal to 360 degrees. In embodiments in which the travel path 901 is 360 degrees (or any other embodiments), rotational stops may be provided at one or both of the first end and second end of the travel path 901 so as to prevent the valve member 204 from being rotated past the first end and/or second end of the travel path 901.

Although the first travel path portion 901a, second travel path portion 901b and third travel path portion 901c have each been described as defining substantially equal portions of the travel path 901 (e.g. 90 degree portions), in other embodiments, one or more of the first travel path portion 901a, second travel path portion 901b and third travel path portion 901c may be defined by lengths that vary from that of the remaining portions of the travel path 901.

According to various embodiments, movement of the valve member 204 to regulate flow through the valve 200 is effectuated by the actuator 1200 in response to any combination of one or more input signals received by the actuator 1200 from any number of one or more input sources. The input signal(s) received from the input source(s) may cause the actuator 1200 to drive the valve member 204 to any one or more locations along some or all of the first travel path portion 901a, second travel path portion 901b, and/or third travel path portion 901c.

The locations along the travel path 901 to which the actuator 1200 is driven in response to the input signal(s) from the input source(s) may vary based on any number of conditions and variables. As one example, according to various embodiments, it may be desired that the valve member 204 be restricted to travel along a portion(s) of the travel path 901 that corresponds to less than a full range of the travel path 901. For example, in some embodiments it may be desired that the actuator 1200 limit the maximum flow to/from the first fluid supply source and/or the maximum flow to/from the second fluid supply source to less than the maximum flow that would occur in a fully open configuration of the first port 206 and/or second port 208.

In some embodiments, it may be desired that a minimum degree of flow to/from the first fluid supply source and/or the second fluid supply source corresponds to a no-flow, fully closed configuration of the first port 206 and/or second port 208. In such embodiments, the actuator 1200 may be configured to drive the valve member 204 to any desired no-flow valve member 204 position along the travel path 901 in response to input(s) from the input source(s). In other embodiments, the actuator 1200 may be configured to drive the valve member 204 to any desired combination of two or more no-flow valve member 204 positions along the travel path responsive to inputs from the input source(s). Alternatively, in some embodiments it may be desired that a minimum flow to/from the first fluid supply source and/or the second fluid supply corresponds to a non-zero degree of flow.

According to various embodiments, the input signal(s) received by the actuator 1200 may be VAC and/or VDC voltages of any desired magnitude. In some embodiments, a minimum input voltage that is supplied by the power source to control the actuator 1200 may correspond to a non-zero voltage (e.g. 2 VDC or 2 VAC), so as to distinguish an intentional 0V input signal from an unintentional 0V situation (e.g. a malfunctioning of the input/power source).

As illustrated by the actuator 1200 embodiments described with reference to FIGS. 15 and 16, in various embodiments the actuator 1200 may be configured to drive the valve member 204 based on input signals from a first input source Y1, and a second input source Y2 that is different from the first input source Y1. According to some such dual-input source actuator 1200 embodiments, when no input signal(s) is received from the Y2 input source, input signal(s) received from a first input source Y1 may generally be configured to control the flow of fluid from/to the first fluid source (e.g., by driving the valve member 204 to one or more positions along the first travel path portion 1501a, 1601a and optionally along the no-flow, second travel path portion 1501b, 1601b). When no input signal(s) is received from the Y1 input source, input signals from the Y2 input source may be generally configured to control flow of fluid from/to the second fluid source (e.g., by driving the valve member 204 to one or more positions along the third travel path portion 1501c, 1601c and optionally along the no-flow, second travel path portion 1501b, 1601b). As will be appreciated, according to various dual-input source actuator 1200 embodiments such as, e.g., the embodiments illustrated in FIGS. 15 and 16, inputs from each of the first input source Y1 and the second input source Y2 may be used to control the actuator 1200 to drive the valve member 204 in each of a first direction (e.g. CW) and a second, opposite direction (e.g. CCW).

Figure 15:
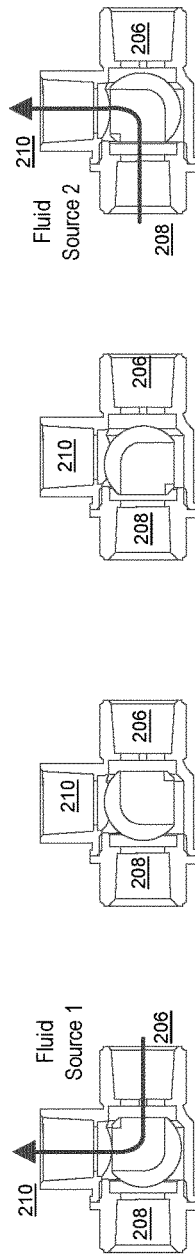
FIG. 15 is a table and diagram representative of the operation of an actuator, according to an exemplary embodiment.

Referring to FIG. 15, according to various embodiments, the actuator 1200 may be configured to control flow through the valve 200 based on dual analog inputs received from a first input source Y1 and a second input source Y2. As will be appreciated, the analog nature of the inputs from the first input source Y1 and second input source Y2 to allow the actuator 1200 to proportionally control the movement of the valve member 204 between a first travel range using input signals from the first input source Y1 and between a second travel range using input signals from the second input source Y2.

According to some such embodiments, the actuator 1200 may be configured to control movement of the valve member 204 along a first travel range that substantially corresponds to the first travel path portion 1501a in response to input signals received from the first input source Y1, and no input received from the second input source Y2. In such embodiments, a maximum input signal from the first input source Y1 (e.g., 10 VDC) corresponds to a fully open first port 206 configuration of the valve 200 (i.e. a 0 degree position along the travel path 1501) and a minimum input signal (e.g., 0V or 2 VDC) from the first input source Y1 corresponds substantially to the no-flow, fully closed first port 206 configuration defined at the end of the first travel path portion 1501a. For input signals from the first input source Y1 defined by intermediate voltages of a magnitude between the minimum voltage and maximum voltage (i.e., input signals with a voltage within the first input source Y1 input signal voltage range), the actuator 1200 may be controlled in a proportional manner along the first travel path portion 1501a, with such intermediate voltages corresponding to any number of intermediate valve member 204 orientations providing for partial flow through the first port 206 (e.g., as defined in Table 1 below).

In some such embodiments, the actuator 1200 may also be configured to control movement of the valve member 204 along a second travel range that corresponds to the third travel path portion 1501c in response to input signals received from the second input source Y2, and no input received from the first input source Y1. In such embodiments, a maximum input signal from the second input source Y2 (e.g., 10 VDC) corresponds to a fully open second port 208 configuration of the valve 200 (i.e. the end position of the travel path 1501, such as, e.g., 270 degrees), and a minimum input signal from the second input source Y2 corresponds substantially to the no-flow, fully closed first port 208 configuration defined at the first end of the third travel path portion 1501c. For input signals from the second input source Y2 defined by intermediate voltages of a magnitude between the minimum voltage and maximum voltage (i.e., input signals with a voltage within the second input source Y2 input signal voltage range), the actuator 1200 may be controlled in a proportional manner along the third travel path portion 1501c, with such intermediate voltages corresponding to any number of intermediate valve member 204 orientations providing for partial flow through the second port 208 (e.g., as defined in the Table 1 below).

The orientation to which the valve member 204 is driven in the event of no input from either the first input source Y1 or the second input source Y2 may be selected according to any number of different factors. For example, as shown by Table 1 below, in some embodiments, the valve member 204 orientation may depend on the input source Y1 or Y2 from which the last input was received by the controller. For example, in order to minimize energy usage, the no-input valve member 204 configuration may correspond to a no-flow orientation lying along the second travel path portion 1501b near a first end of the second travel path portion 1501b (i.e., the end of the second travel path portion 1501b closest to the first travel path portion 1501a) in the event that the last input was received from the first input source Y1, while the no-input valve member 204 configuration may correspond to a no-flow orientation lying along the second travel path portion 1501b near a second end of the second travel path portion 1501b (i.e., the end of the second travel path portion 1501b closest to the third travel path portion 1501c) in the event that the last input was received from the second input source Y2. Alternatively, in some embodiments the no-input valve member orientation may correspond to any desired no-flow or flow location along the travel path 901 (e.g. a no-flow valve member orientation equidistant between the first travel path portion 1501a and the third travel path portion 1501c, such as, e.g., 135 degrees).

As the actuator 1200 is not configured to be controlled via simultaneously received non-zero voltage inputs from the first input source Y1 and second input source Y2, as shown by Table 1 below, such a situation is treated as an error situation.

206 correspond to a non-zero flow. In yet other embodiments, it may be desired to ensure that the actuator 1200 is operable to entirely prevent flow through the first port 206, in which situations it may be desirable that the actuator 1200 drive the valve member 204 into a portion of the no-flow second travel path portion 1501b, so as to avoid situations in which slight variations in shape/size/configuration of the valve member 204 and/or valve body 202 and/or slight variations in the degree to which the valve member 204 is driven by the actuator 1200 may result in the first port 206 being substantially, but not entirely, closed at the end of the first travel path portion 1501a.

In such embodiments, the valve member 204 may be driven by the actuator 1200 in response to input signals from the first input source Y1 according to the equation provided in Table 2 below. In particular, in such embodiments, a first end of the travel path of the first input source Y1 (corresponding to a maximum input voltage from the first input source Y1) is defined by a location $x1_{Initial}$ along the valve 200 travel path 1501 corresponding to a valve member 204 orientation at which a desired maximum degree of flow through the first port 206 is attained. As also shown in Table 2, the $x1_{Initial}$ valve member 204 orientation corresponding to such a desired maximum degree of flow through the first port 206 is a function of the length of the first travel path portion 1501a, wherein a maximum degree of flow through the first port 206 of "1" corresponds to the fully open configuration of the first port 206 defined at the first end of the travel path 1501, a minimum degree of flow through the first port 206 of "0" corresponds to a fully closed configuration of the first port 206 as defined at the end of the first travel path portion 1501a, and intermediate degrees of flow through the first port 206 (i.e. values between "1" and "0") are defined proportionally between the ends of the first travel path portion 1501a.

TABLE 1

| If Y1 Input; No Y2 Input | $x = 1st$ Travel Path Portion Range$\left(1 - \dfrac{Y1\ \text{Voltage}}{Y1\ \text{Voltage Range}}\right)$ |
|---|---|
| If No Y1 Input; No Y2 Input | x = 1st Travel Path Portion Second End (If Last Input Source Y1)<br>x = 3rd Travel Path Portion 1st End (If Last Input Source Y1)<br>OR<br>Travel Path 1st End ≤ x ≤ Travel Path 2nd End |
| If No Y1 Input; Y2 Input | $x = TTPR - 3rd\ TPPR\left(1 - \dfrac{Y2\ \text{Voltage}}{Y2\ \text{Voltage Range}}\right)$<br><br>TTPR = Total Travel Path Range<br>TPPR = Travel Path Portion Range |
| If Y1 Input; Y2 Input | Error |

In contrast to the embodiments described above with reference to Table 1, in which a travel path of the first input source Y1 (defined between valve member 204 orientations corresponding to a maximum input voltage from a first input source Y1 and a minimum input voltage from the first input source Y1) corresponds to the first travel path portion 1501a of the valve 200, in other embodiments, a travel path of the first input source Y1 may vary from the first travel path portion 1501a. For example, according to some embodiments, it may be desired that a maximum flow of a fluid through the first port 206 correspond to a flow that is less than the flow corresponding to a fully open configuration of the first port 206. Alternatively, or additionally, it may be desired that a minimum flow of fluid through the first port As noted above, a second end of the travel path of the first input source Y1 (corresponding to a minimum input voltage from the first input source Y1) may be defined by either a location along the first travel path portion 1501a, or may be defined by any other location along the travel path 1501 of the valve 200. As discussed above, in some situations, it may be desired that a minimum input voltage from the first input source Y1 correspond to a non-zero minimum desired degree of flow through the first port 206. As shown in Table 2 below, in such embodiments, the end position $x1_{End}$ that defines the valve member 204 orientation corresponding to the minimum input voltage from the first input source Y1 may be determined as a function of the location along the first travel path portion 1501a corresponding to the desired minimum flow through the first port 206. Alternatively, in embodiments in which it is desired that the minimum input voltage from the first input source Y1 correspond to a no-flow valve member 204 orientation (defined by any other valve member 204 orientation anywhere along the travel path 1501 of the valve member 204), the second end position $x1_{End}$ of the travel path of the first input source Y1 may be defined by the desired no-flow valve member 204 orientation (or other desired orientation) along the travel path 1501.

As will be understood, in situations in which a travel path of the second input source Y2 (defined between valve member 204 orientations corresponding to a maximum input voltage from the second input source Y2 and a minimum input voltage from the first input source Y2) varies from the third travel path portion 1501c, the $x2_{Initial}$ valve member 204 orientation along the travel path 1501 corresponding to a maximum input voltage from the second input source Y2 and defining a first end of the travel path of the second input source Y2, and the $x2_{End}$ valve member 204 orientation along the travel path 1501 corresponding to a minimum input voltage from the second input source Y2 and defining a second end of the travel path of the second input source Y2 may be selected based on similar considerations as discussed with reference to the first input source Y1.

existing thermostats (and/or other devices having controllers that outlet signals other than two analogs outputs).

Figure 16:
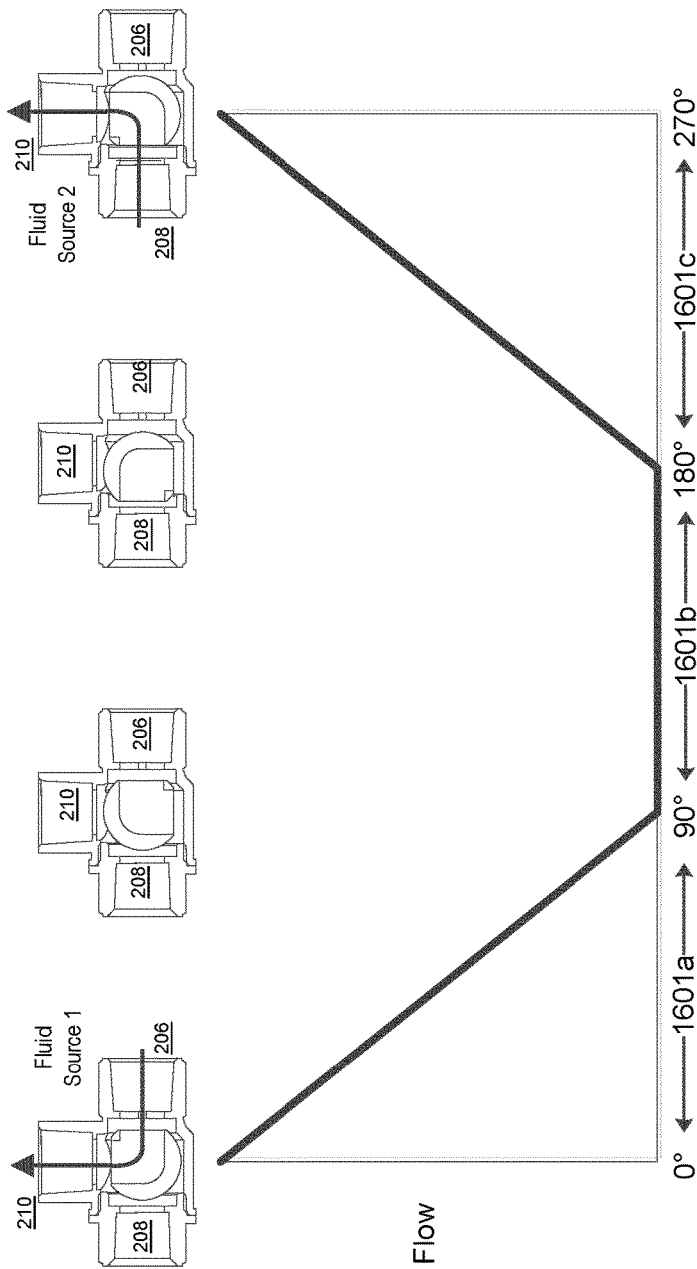
FIG. 16 is a table and diagram representative of the operation of an actuator, according to an exemplary embodiment.

Referring to FIG. 16, an actuator 1200 configured to control flow through the valve 200 responsive to two binary inputs from two different input sources (e.g., from wires that connect the actuator 1200 to a controller 1002) is described according to one embodiment. Similar to the embodiment of FIG. 15, the dual-binary-input actuator 1200 embodiment of FIG. 16 may be configured to control the degree of fluid flow from/to the first fluid source through the valve 200 (either from the first port 206 to the third port 210 as shown in FIG. 16, or from the third port 210 to the first port 206) responsive to an input received from a first input source Y1, and to control the degree of fluid flow from/to the second fluid source through the valve 200 (either from the second port 208 to the third port 210 as shown in FIG. 16, or from the third port 210 to the second port 208) responsive to an input received from a second input source Y2.

As shown by Table 3 below, in such dual-binary input actuator 1200 embodiments as described with reference to FIG. 16, a maximum, or "on" input signal voltage (e.g. 24 VAC) from the first input source Y1 may correspond to a location along the first travel path portion 1601a corresponding to a maximum desired degree of flow through the first

TABLE 2

| | |
|---|---|
| If Y1 Input; No Y2 Input | $x = x1_{End} + \dfrac{\Delta x1}{Y1 \text{ Voltage Range}}(Y1_{min\ voltage} - Y1 \text{ Voltage})$ <br><br> Where: <br> $\Delta x1 = x1_{End} - x1_{Initial}$ <br> $x1_{Initial}$ = 1st TPPR (1 − Max Desired 1st Port Flow) <br> AND <br> $x1_{End}$ = 1st TPPR(1 − Min Desired 1st Port Flow) <br> OR <br> $x1_{End}$ = Desired noflow (or other) Valve Member Oreintation <br> TPPR = Travel Path Portion Range |
| If No Y1 Input; No Y2 Input | $x = x1_{End}$ (If Last Input Source Y1 <br> $x = x2_{End}$ If Last Input Source Y1 <br> OR <br> Travel Path 1st End ≤ x ≤ Travel Path 2nd End |
| If No Y1 Input; Y2 Input | $x = x2_{End} + \dfrac{\Delta x2}{Y2 \text{ Voltage Range}}(Y2 \text{ Voltage} - Y2_{min\ voltage})$ <br><br> Where: <br> $\Delta x2 = x2_{End} - x2_{Initial}$ <br> $x2_{Initial}$ = TTPR − 3rd TPPR (1 − Max Desired 2nd Port Flow) <br> AND <br> $x2_{End}$ = TTPR − 3rd TPPR (1 − Min Desired 2nd Port Flow) <br> OR <br> $x2_{End}$ = Desired noflow (or other) Valve Member Oreintation <br> TTPR = Total Travel Path Range <br> TPPR = Travel Path Portion Range |
| If Y1 Input; Y2 Input | Error |

Figure 17:
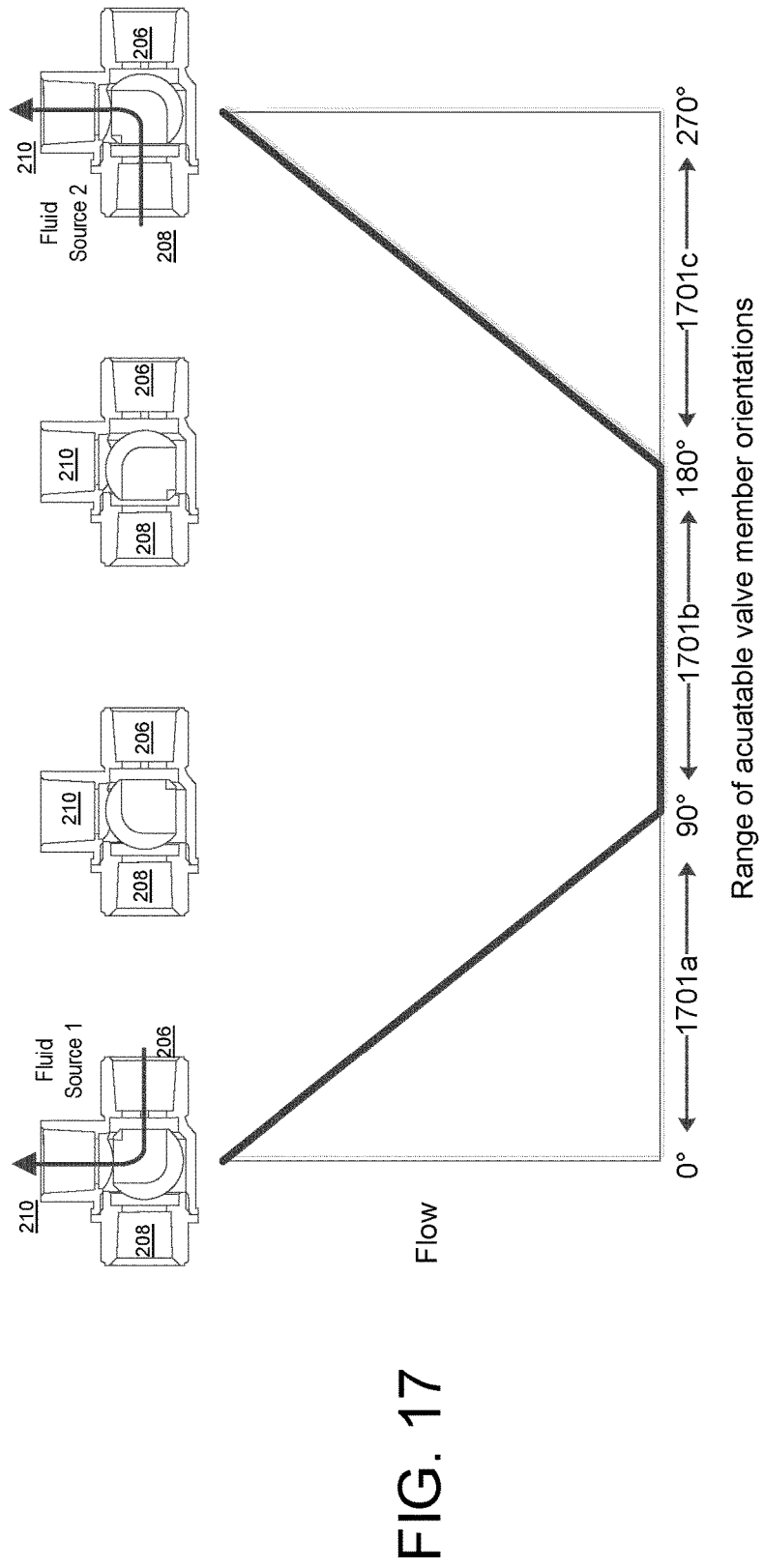
FIG. 17 is a table and diagram representative of the operation of an actuator, according to an exemplary embodiment.

In some embodiments, the controller 1002 from which the actuator 1200 receives input(s) may comprise a thermostat controller. As many commonly used thermostats are not configured to output two analog inputs by which to control an actuator, according to various embodiments, the actuator 1200 may advantageously be configured to operate based on inputs other than two analog inputs. Additionally, as systems that require significant amount of analog signal processing are typically associated with higher costs than systems that require minimal or no analog signal processing, embodiments of actuator 1200 that operate based on inputs other than two analog inputs may advantageously provide for a more cost-effective actuator. Accordingly, described with reference to FIGS. 16 and 17 are embodiments of cost-efficient actuators 1200 that may be utilized with many port 206. A minimum, or "off" input signal (e.g., 0V) may correspond to a minimum desired degree of flow through the first port 206, which may correspond either to a valve member 204 orientation along the first travel path corresponding to a desired minimum partial flow through the first port 206, or may correspond to the no-flow end position of the first travel path portion 1601a or any other no-flow position (or other position) along the travel path 1601.

A maximum, or "on" input signal voltage from the second input source Y2 (e.g. 24 VAC) may correspond to a location along the third travel path portion 1601c corresponding to a desired degree of flow through the second port 208. A minimum, or "off" input signal (e.g., 0V) may correspond to a minimum desired degree of flow through the second port 208, which may correspond either to a valve member 204 orientation along the third travel path 1601c corresponding to a desired minimum partial flow through the second port 208, or may correspond to the no-flow end position of the third travel path portion 1601c or any other no-flow position (or other position) along the travel path 1601.

As shown in Table 3 below, similar to the actuator 1200 embodiments described with reference to Tables 1 and 2 above, in dual-binary input actuator 1200 embodiments such as, e.g., discussed with reference to FIG. 16, the valve member 204 orientation in a situation in which no input from either the first input source Y1 or the second input source Y2 is received may depend on the last input source Y1 or Y2 that was used to control the operation of the actuator 1200. For example, as shown by Table 3 below, in some embodiments, to minimize energy usage, the no-input valve member 204 configuration may correspond to a no-flow orientation lying along the second travel path portion 1501b near a first end of the second travel path portion 1501b (i.e., the end of the second travel path portion 1501b closest to the first travel path portion 1501a) if the last input was received from the first input source Y1, while the no-input valve member 204 configuration may correspond to a no-flow orientation lying along the second travel path portion 1501b near a second end of the second travel path portion 1501b (i.e., the end of the second travel path portion 1501b closest to the third travel path portion 1501c) if the last input received was received from the second input source Y2. Alternatively, in some embodiments the no-input valve member orientation may correspond to any desired location on the travel path 901, (e.g. a no-flow valve member orientation equidistant between the first travel path portion 1501a and the third travel path portion 1501c, such as, e.g., 135 degrees).

As the actuator 1200 is not configured to be controlled via simultaneously received non-zero voltage inputs from the first input source Y1 and second input source Y2, as shown by Table 3 below, such a situation is treated as an error situation.

TABLE 3

| If Y1 Input; No Y2 Input | x = Desired 1st Travel Path Portion Valve Member Orientation |
|---|---|
| If No Y1 Input; No Y2 Input | x = 1st Travel Path Portion 2nd End (If Last Input Source Y1) |
| | x = 3rd Travel Path Portion 1st End (If Last Input Source Y2) |
| | OR |
| | Travel Path 1st End ≤ x ≤ Travel Path 2nd End |
| if No Y1 Input; Y2 Input | x = Desired 3rd Travel Path Portion Valve Member Orientation |
| If Y1 Input; Y2 Input | Error |

According to some embodiments, additional control over the operation of the actuator 1200 via which the actuator 1200 may drive the valve member 204 to additional locations along the travel path 1601 of the valve 200 may be attained by configuring the actuator 1200 to be responsive to any number of additional binary input signals from any number of additional input sources. As will be understood, in such embodiments, the valve member 204 orientation corresponding to the minimum "off" voltage input from the additional input source and the maximum "on" voltage input from the additional input source may be used to control the actuator 1200 to drive the valve member 204 to any number of different orientations along the travel path 1601.

As described with reference to FIG. 17, according to some embodiments, the actuator 1200 may be configured to operate the valve 200 in response to an analog input received from a single input source (e.g., from a wire that connects the actuator 1200 to a controller 1002). In contrast to the embodiments of FIGS. 15 and 16, in which the actuator 1200 may be configured to independently control the flow of fluid from a first fluid supply through the valve 200 responsive to an input(s) from a first input source Y1 and to independently control the flow of fluid from a second fluid supply through the valve 200 responsive to an input(s) from a second input source Y2, the single analog input actuator 1200 embodiment of FIG. 17 is configured to control of the flow of fluid from each of the first fluid supply and the second fluid supply responsive to a single input Y3. In other words, in contrast to the dual input source actuator 1200 embodiments of FIGS. 15 and 16, in which a first input source Y1 may control movement/rotation of the drive member 204 along a first portion of the travel path 901, and a second input source Y2 may control movement/rotation of the drive member 204 along a second portion of the travel path 901, the single input source Y3 from which input signals are received by the actuator 1200 of the embodiment of FIG. 17 may be used to control movement/rotation of the drive member 204 along the entirety of (or any desired portion of) the travel path 901.

As shown in FIG. 17, in such single, analog input source embodiments, a predetermined minimum input voltage (e.g. 0 or 2 VDC) may correspond to a fully, or partially, open first port 206 configuration defined by a valve member 204 orientation along the first travel path portion 1701a. A predetermined maximum input voltage signal (e.g. 10 VDC) may correspond to a fully, or partially, open second port 208 configuration defined by a valve member 204 orientation along the third travel path portion 1701c.

At input signals from input source Y3 having a voltage that ranges between the minimum input voltage and the maximum input voltage (i.e. at intermediate voltages within the voltage range defined between the minimum input voltage and the maximum input voltage), the actuator 1200 may operate to drive the valve member 204 to any number of valve member 204 orientations defined along the travel path defined by the inputs from the input source Y3 that proportionally correspond to the magnitude of the input voltage received from the input source Y3. For example, as shown in FIG. 17, for a valve 200 defining a 270 degree travel path 1701 in which a minimum input voltage of 0V is corresponds to the first end (i.e. 0 degrees) of the travel path 1701 and a maximum input voltage of 10 VDC corresponds to the second end (i.e. 270 degrees) of the travel path 1701, an intermediate voltage input signal (e.g. 5 VDC) may correspond to a no-flow position of the valve member 204 at between approximately 135 degrees. As discussed above, according to various embodiments, a minimum voltage from the input source Y3 may advantageously correspond to a non-zero voltage signal (e.g. 2 VDC), so as to distinguish a situations in which a 0V, input, is provided to the actuator 1200 intentionally to drive the valve member 204 to the corresponding minimum input orientation from situations in which an unintentional 0V input (e.g., resulting from improper functioning of the input source Y3, a power failure, etc.) causes the actuator 1200 to drive the valve member 204 to the corresponding minimum voltage orientation. As shown below, the position to which the actuator 1200 will drive the valve member 204 in response to an input voltage from the input source Y3 may be determined as:

$$x = x1 + \frac{\Delta x}{\text{Voltage Range}}(Y3 \text{ voltage} - Y3_{min\ voltage})$$

Where:
Δx=x2−x1
x1=1st TPPR(1−Max Desired 1st Port Flow)
x2=TTPR−3rd TPPR(1−Max Desired 2nd Port Flow)
TPPR=Travel Path Portion Range
TTPR=Total Travel Path Range With reference to FIGS. 15-17, the various embodiments of controlling an actuator 1200 have been described with reference to the use of the actuator 1200 inputs to effectuate movement of a 270° valve 200 in which a) a 0° rotational orientation of the valve member 204 allows for maximum flow between a first port 206 and a third port 210; b) a rotational positions of the valve member 204 at between approximately 90° and 180° correspond to a no-flow orientations of the valve 200; and c) a rotational position of approximately 270° of the valve member 204 allows for maximum flow between a second port 208 and the third port 210. However, it is to be understood that according to other embodiments, the various embodiments described with reference to FIGS. 15-17 may additionally, or alternatively, be used to control the valve 200 to effectuate movement of the valve member 204 to any other number of, and combination of, other valve member 204 positions/orientations and/or with valves 200 defining travel paths 901 defining a range other than 270 degrees.

Additionally, although in the embodiments of FIG. 15 each of the first input source Y1 and second input source Y2 are described as providing analog inputs to the actuator 1200, and in the embodiment of FIG. 16 each of the first input source Y1 and second input source Y2 are described as providing binary inputs to the actuator 1200, in other embodiments the actuator 1200 may be configured to control the flow of fluid to/from a first fluid supply using analog inputs (such as, described with reference to FIG. 15), and control the flow of fluid to/from a second fluid supply using binary inputs (such as, e.g., described with reference to FIG. 16). Also, as will be understood, the types of voltage supply (i.e. VDC or VAC) and the minimum/maximum input voltages used in describing the operation of the actuator 1200 in the embodiments of FIGS. 15-17 are intended for illustrative purposes only.

According to various embodiments, an actuator 1200 may be defined by a single operational mode as described in one or more of FIG. 15, FIG. 16 or FIG. 17. However, as noted above, given the variety of different types of outputs provided by different thermostats (or other control devices) with which it may be desired to use the actuator 1200, according to some embodiments, the actuator 1200 may be configured to operate in any one or more of the operational modes described with reference to FIGS. 15-17 and/or in any other operational modes. In some such embodiments, the selection of an operational mode for the actuator 1200 may be based on user input (e.g., via a manual switch provided on the actuator). Alternatively, or additionally, in some embodiments, the actuator 1200 may be configured to detect the type of input(s) being provided from the thermostat/control device, and may automatically select the appropriate operational mode. Additionally, or alternatively, according to various embodiments, the actuator 1200 may be configured to receive user inputs (e.g. via controller and/or via a switch on the actuator 1200) that designate various operational characteristics (such as, e.g., valve member 204 orientation corresponding to minimum/maximum input voltage(s); maximum/minimum degrees of flow through the first port 206 and/or second port 208, etc.).

Referring to FIGS. 18-22, an actuator 1200 according to any embodiment described above is a multi-operational mode actuator 1800. During normal use (i.e. when the actuator 1800 is receiving power from an external power source 500), the actuator 1800 operates in a first operational mode. Upon loss of power to the actuator 1800 (e.g., during a power outage or in response to any other interruption of power from the external power source 500 to the actuator 1800) the actuator 1800 operates in a second (e.g. failsafe) operational mode. When operating in the failsafe mode, the actuator 1800 is configured to drive the valve member 204 to a failsafe setpoint (i.e., a specific orientation of the valve member 204 relative to the valve body 202). The orientation of the valve member 204 defining the failsafe setpoint may correspond to any location along the travel path 901 of the valve 200, including any of a partial flow, full flow, or no-flow valve 200 orientation.

Given the ability of the valve 200 to control flow from multiple fluid supplies, the actuator 1800 is advantageously configured to allow the valve member 204 to be driven to different failsafe setpoints, based on which fluid supply source was being controlled by the actuator 1800 and/or the orientation of the valve member 204 at the time of the power interruption. In addition to allowing a different failsafe setpoint to be defined for each fluid supply coupled to the valve 200, the actuator 1800 may also optionally allow additional failsafe setpoints to be defined for and assigned to specific portions of, or positions along, the travel path 901. For example, the failsafe setpoint to which the valve member 204 is driven when a loss of external power occurs during operation of the valve member 204 within a first range of the first travel path portion 901a (which controls flow to/from a first fluid supply source) may differ from the failsafe setpoint to which the valve member 204 is driven when a loss of external power occurs during operation of the valve member 204 within a second range of the first travel path portion 901a. In addition to the use of the actuator 1800 to operate a valve such as valve 200 (or any of the other valves 110, 120, 300, etc. described herein), an actuator 1800 as described herein and shown with reference to FIGS. 18-22 may also be used with any number of changeover or other multi-source valve systems and/or with any number of other selectively actuatable components (e.g. dampers, other HVAC elements, etc.)

Figure 18:
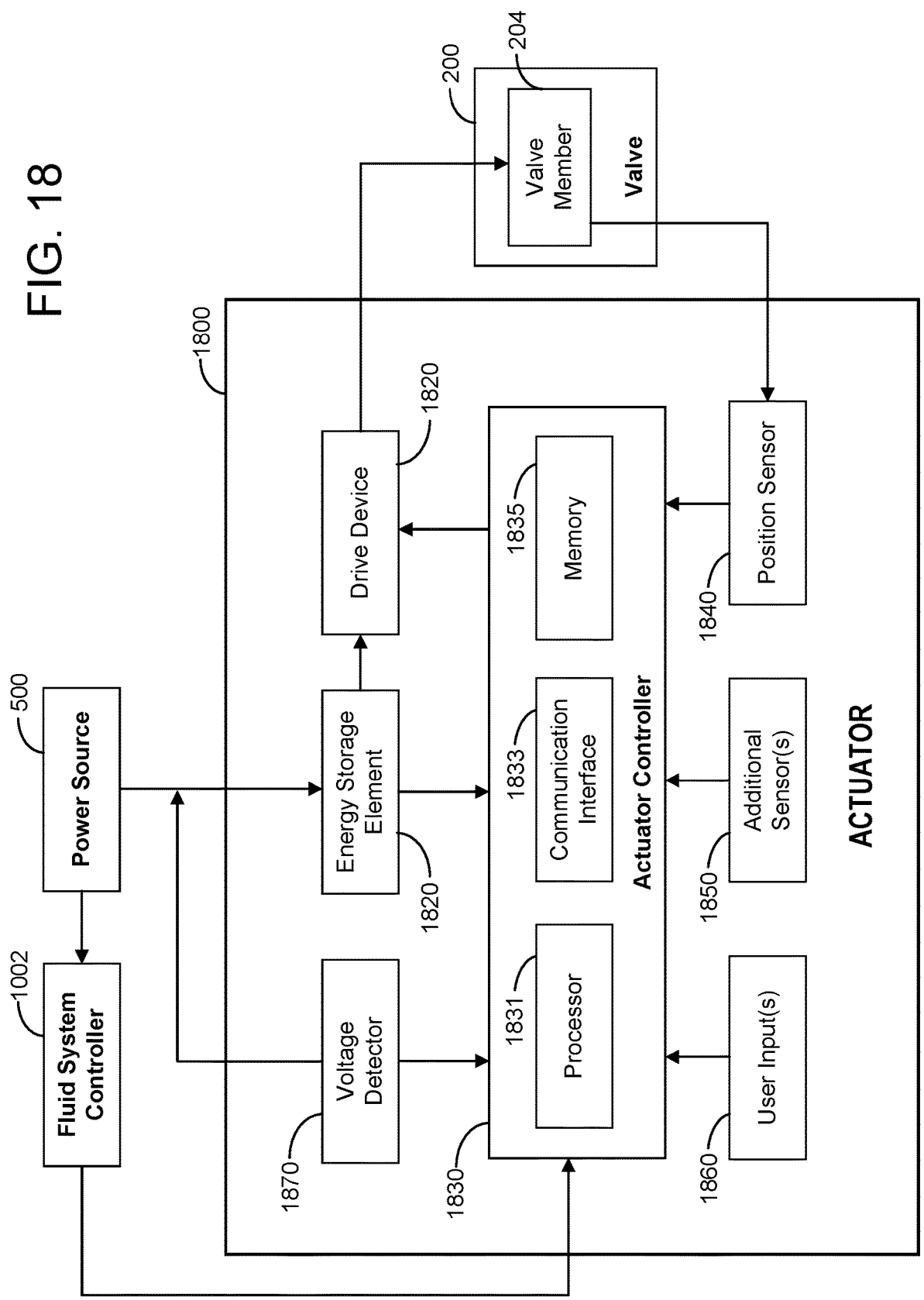
FIG. 18 is a block diagram of an actuator according to an exemplary embodiment.
Figure 19:
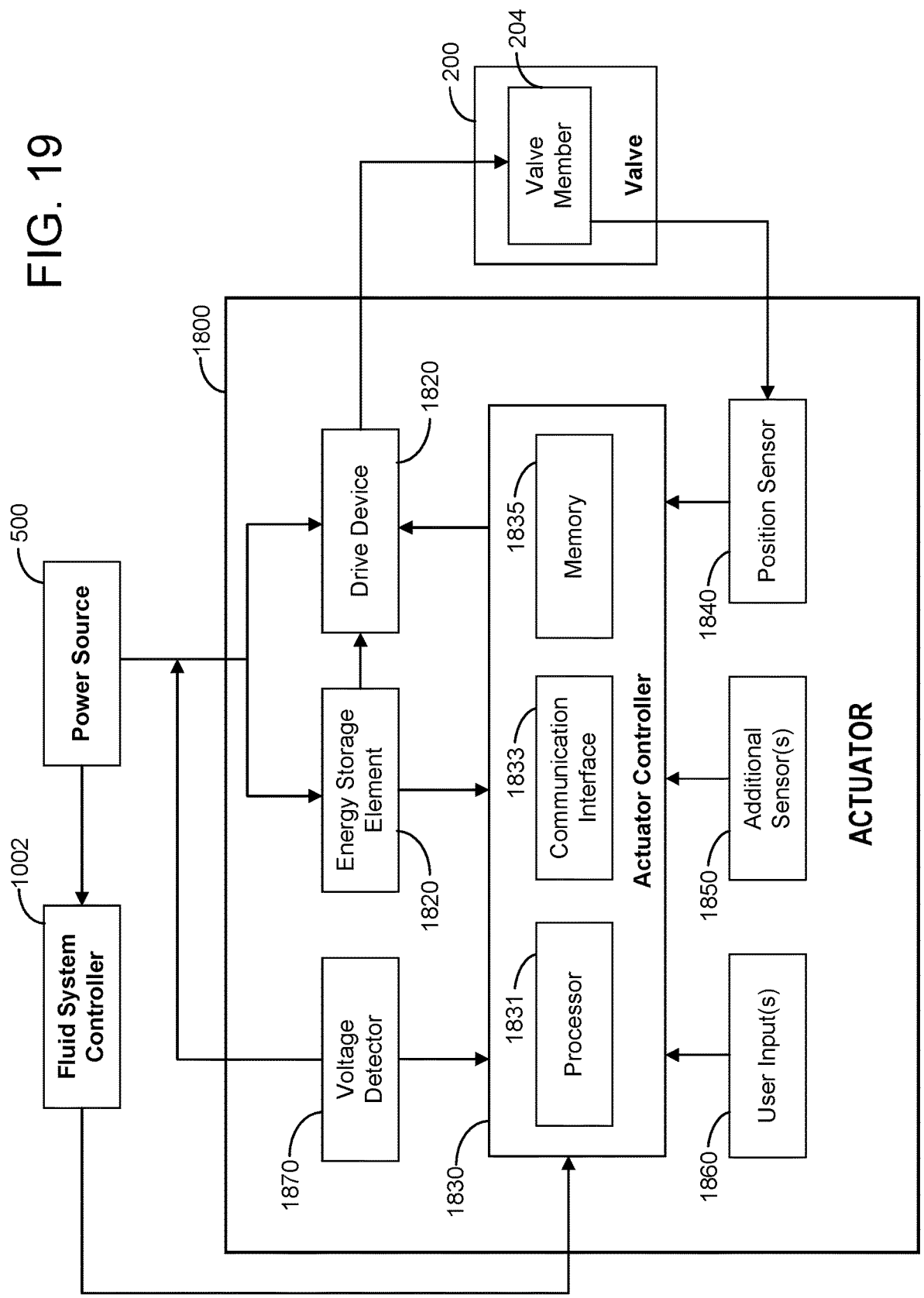
FIG. 19 is a block diagram of an actuator according to exemplary embodiments.

A block diagram of an actuator 1800 according to exemplary embodiments is shown in FIG. 18 and FIG. 19. The actuator 1800 includes a drive device 1810 operably coupled to the valve member 204 and an energy storage element 1820 configured to store energy received from an external power source 500. The drive device 1810 is configured to effectuate movement of the valve member 204 to achieve a desired flow of fluid from a first fluid supply source or a second fluid supply source through the valve 200 in response to receiving power from either the external power source 500 or the energy storage element 1820. The drive device 1810 drives the valve member 204 in accordance with instructions received from an actuator controller 1830. The actuator 1800 optionally also includes a variety of additional components, such as, e.g., a position sensor 1840, one or more additional sensors 1850 (e.g., temperature sensor, flow sensor, etc.), a user input 1860 (e.g. a manual switch provided on the actuator 1800, a connection to a remotely located GUI or other network input), a voltage detector 1870, etc.

The drive device 1810 may comprise a variety of different mechanisms (e.g. a motor, a spring system, etc.) that are directly or indirectly connected to the valve member 204 to effectuate movement of the valve member 204 relative to the valve body 202 upon receiving energy from the energy storage element 1820. For example, the drive device 1810 is defined by a motor operably connected to the valve 200 via an output shaft, gear teeth, or any other combination of structures.

As shown in FIG. 18, in various embodiments the drive device 1810 receives power from the energy storage element 1820 during operation of the actuator 1800 in each of the first mode of operation (i.e. while the actuator 1800 is receiving power from the external power source 500) and in a failsafe mode of operation (i.e. during a power loss event). In such embodiments, the operation of the actuator 1800 may be delayed until the energy storage element 1820 has been sufficiently charged by the power source 500. As shown in FIG. 19, in other embodiments the drive device 1810 is configured to receive power directly from the external power source 500 during the first mode of operation of the actuator 1800, and to receive power from the energy storage element 1820 during failsafe operation of the actuator 1800.

The energy storage element 1820 includes any number of devices (e.g. capacitor, battery, spring-system, etc.) configured to store and selectively release energy (e.g., electrical, chemical, mechanical, etc.). The energy storage element 1820 receives and stores energy from the external power source 500. In various embodiments, the energy storage element 1820 may be provided precharged with energy. In the event of a power loss, the drive device 1810 utilizes energy stored by the energy storage element 1820 to effectuate the movement (e.g. rotation) of the valve member 204 to the failsafe setpoint.

The energy storage element 1820 may be charged using power from the power source 500 according to any number of different modes. For example, the energy storage element 1820 may be charged by the power source 500 to a full capacity (or any other predetermined capacity) during operation of the actuator 1800 in the first mode (i.e. when the actuator 1800 is receiving power from an external power source 500).

In other embodiments, the actuator controller 1830 is optionally configured to dynamically and selectively control the charging and/or discharging of the energy storage element 1820 during operation of the actuator 1800 in the first mode. In such embodiments, the energy stored by the energy storage element 1820 at a particular point in time corresponds, or substantially corresponds, to the energy that would be required to drive the valve member 204 from its current position to the failsafe setpoint. The actuator controller 1830 controls the selective charging and/or discharging of the energy storage element 1820 in response to the valve member 204 being driven to a new position and/or in response to an update to the failsafe setpoint. In some such embodiments, the actuator controller 1830 additionally stores (e.g., in a memory 1835 of the actuator controller 1830) the current location of the valve member 204 relative to the fail safe setpoint as the valve member 204 is driven to different positions along the travel path 901 during operation of the actuator 1800 in the first mode. As such, upon a power loss, the actuator controller 1830 may generate a drive signal (described in more detail below) via which the drive device 1810 may drive the valve member 204 to the failsafe setpoint without requiring any additional information or calculations from the actuator controller 1830 to do so.

The actuator controller 1830 includes components such as a processor 1831, a communications interface 1833 (via which the actuator 1800 may communicate with the fluid system controller 1002, sensors external to the actuator 1800, etc.) and a memory 1835. The actuator controller 1830 is configured to interact with and/or control one or more of the other components of the actuator 1800 and/or external components to achieve a desired operation of the valve 200. As described in more detail below, the actuator controller 1830 may be configured to operate according to any number of different modes during operation of the actuator 1800 in the first mode.

Although the actuator controller 1830 is shown in FIG. 18 and FIG. 19 as a single controller that controls the operation of the various components of the actuator 1800, in other embodiments the actuator controller 1830 may be defined by various controllers or other control elements (e.g. circuits) of one or more components of the actuator 1800 and/or components of the fluid system 100.

The memory stores the failsafe setpoints to which the valve member 204 is driven in the event of a power loss. The selection of a first failsafe setpoint 1802a (i.e. an orientation to which the valve member 204 is driven in the event of a power loss during use of the actuator 1800 to control fluid flow to/from the first fluid supply source) and a second fail safe setpoint 1802b (i.e. an orientation to which the valve member 204 is driven in the event of a power loss during use of the actuator 1800 to control fluid flow to/from the second fluid supply source) may be based on any number of variables. The selection of the valve member 204 orientation associated with the first failsafe setpoint 1802a may be independent of the selection of the valve member 204 orientation associated with the second failsafe setpoint 1802b.

Figure 20A:
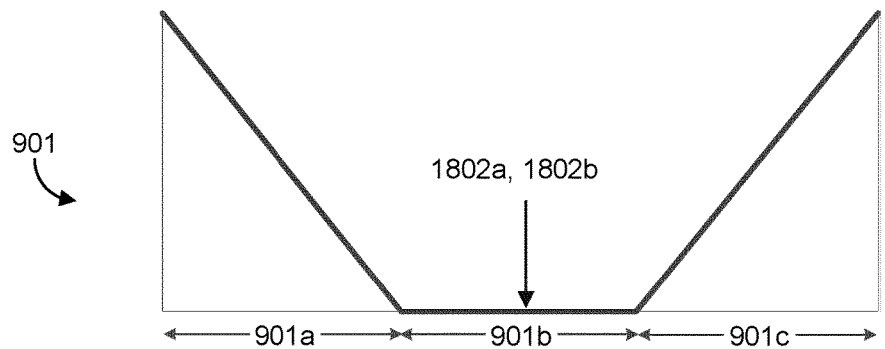
FIGS. 20A-20C are flow diagrams illustrating first failsafe setpoint and second failsafe setpoint valve member configurations, according to exemplary embodiments.
Figure 20B:
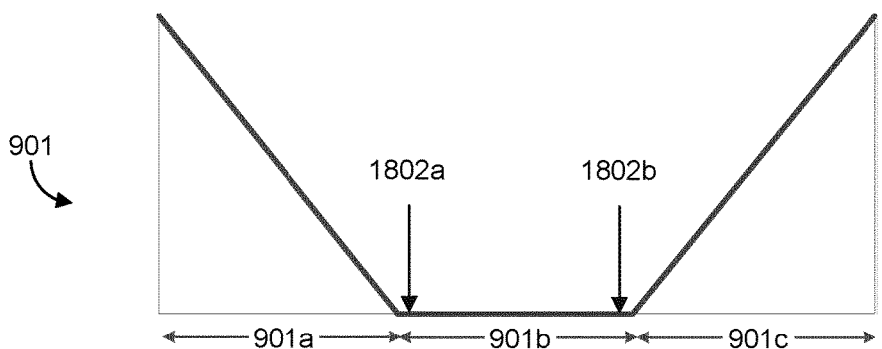

As shown in FIGS. 20A and 20B, in various embodiments it may be desired that each of the first failsafe setpoint 1802a and the second failsafe setpoint 1802b correspond to a no-flow orientation of the valve member 204. In some such embodiments (representatively illustrated in FIG. 20A) the first failsafe setpoint 1802a may correspond to the same no-flow valve member 204 (e.g., a 135 degree orientation of the valve member 204, or any other no-flow position along the second travel path portion 901b) as the valve member 204 position associated with the no-flow second failsafe setpoint 1802b.

In other embodiments (representatively illustrated by FIG. 20B) the first failsafe setpoint 1802a and the second failsafe setpoint 1802b correspond to different no-flow rotational orientations of the valve member 204. For example, the first failsafe setpoint 1802a may be located at the transition between the first travel path portion 901a and the no-flow second travel path portion 901b, while the second failsafe setpoint 1802b may be located at the transition between the no-flow second travel path portion 901b and the third travel path portion 901c, thereby minimizing the degree/distance by which the valve member 204 needs to be driven (and the power required to do so) in the event of a power loss.

In some such embodiments, the no-flow first failsafe setpoint 1802a may be located within the second travel path portion 901b at a position that is spaced by a predetermined distance/degree from the boundary of the second travel path portion 901b and the first travel path portion 901a. Similarly, the no-flow second failsafe setpoint 1802b may be located within the second travel path portion 901b at a location that is spaced by a predetermined distance/degree from the boundary of the second travel path portion 901b and the third travel path portion 901c. Such a selection of first failsafe setpoint 1802a and second failsafe setpoint 1802b may be configured to prevent unintended flow that may occur if the valve member 204 were insufficiently driven the full distance/degree required to reach the failsafe setpoint.

Figure 20C:
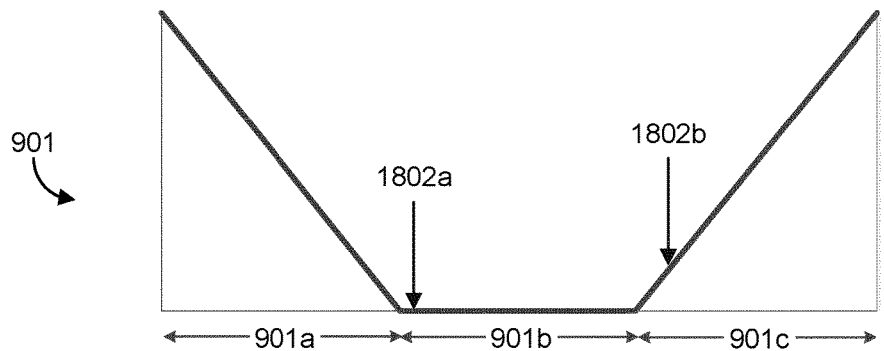

As shown in FIG. 20C, in various embodiments, the first failsafe setpoint 1802a for the first fluid supply may correspond to a no-flow valve member 204 orientation, while the second failsafe setpoint 1802b for the second fluid supply corresponds to a partial or full flow valve member 204 orientation (or vice versa).

In some embodiments, the first failsafe setpoint 1802a and/or the second failsafe setpoint 1802b are hard coded by the actuator controller 1830 and remain unchanged over the course of the operation of the actuator 1800. However, in various embodiments, a desired degree of flow from the first fluid supply source and/or from the second fluid supply source flow in the event of a power loss may vary over the course of operation of the fluid system 100. For example, it may be desired that the valve member 204 be driven to a partial flow valve position during winter months and to no-flow valve position during summer months for one or both of the first fluid source and second fluid source. Accordingly, the first failsafe setpoint 1802a and/or second failsafe setpoint 1802b stored in the memory 1835 may be updated one or more times over the course of operation of the actuator 1800.

In actuator 1800 embodiments in which the first failsafe setpoint 1802a and/or the second failsafe setpoint 1802b may be varied, the actuator 1800 may be configured to allow for varying degrees of modification of the failsafe setpoints. For example, the actuator 1800 may allow for entirely unrestricted control over and selection of a valve 204 orientation that is to define the first fail safe setpoint 1802a and/or second failsafe setpoint 1802b. In other embodiments, the actuator 1800 may be configured to be operated according to one or more preprogrammed or predefined modes in which the failsafe setpoint may be varied in accordance with predetermined parameters. In yet other embodiments, the ability to vary the first failsafe setpoint 1802a and/or the second failsafe setpoint 1802b may be restricted based on any number of other parameters (e.g., allowing only a one-time modification of a failsafe setpoint; restricting the ability of a user to modify a failsafe setpoint under certain operating conditions and/or at certain time, etc.).

In some embodiments, changes to the failsafe setpoint(s) may be controlled entirely by the actuator controller 1830. For example, modifications to the failsafe setpoints may be effectuated in accordance with preprogramed or otherwise predefined actuator 1800 operational modes. Alternatively, (or additionally), the actuator controller 1830 may be configured to dynamically modify (in real-time or at predetermined time intervals) the failsafe setpoints based on one or more variables or conditions (e.g., temperature, pressure, operating characteristics of the fluid system 100, season, weather, time of day, etc.). Such information may be obtained by the actuator controller 1830 from optional sensors 1850 of the actuator 1800 and/or from external sensors, the fluid system controller 1002, or other external systems via the communications interface 1833. In other embodiments, changes to the failsafe setpoints may additionally, or alternatively, be partially or entirely user-driven and based on user inputs received via the user input 1860.

Figure 21:
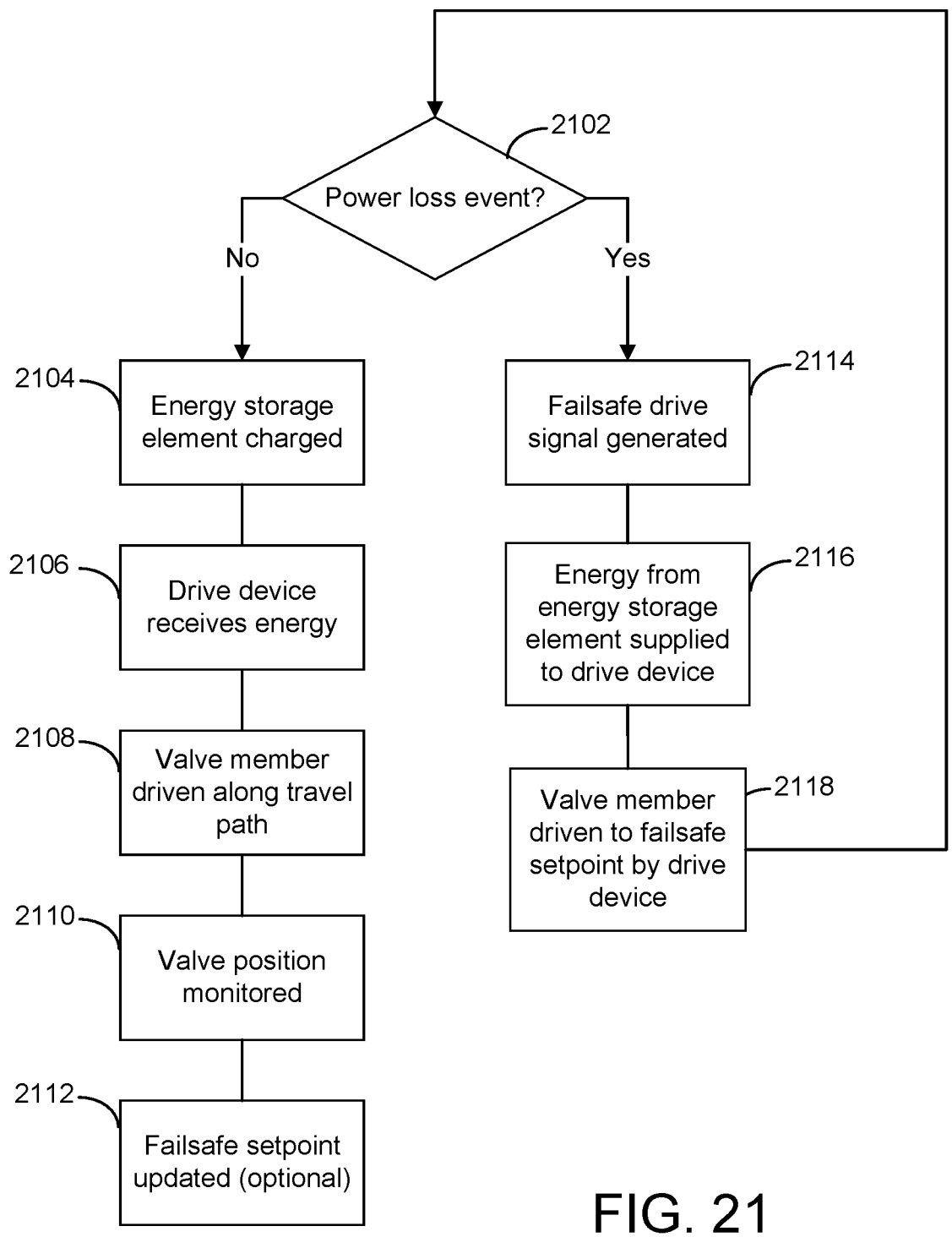
FIG. 21 is a flow chart of a process for operating a fluid system, according to an exemplary embodiment.

Referring to FIG. 21, a method of operating a valve 200 using the actuator 1800 is described according to an exemplary embodiment. As discussed above, and shown by step 2102, the mode according to which the actuator 1800 operates to drive the valve member 204 varies depending on whether the actuator 1800 is receiving power from an external power source 500. The actuator 1800 operates according to a first mode (e.g., such as described with reference to steps 2104-2112) when the actuator 1800 is receiving power from the external power source 500). The actuator 1800 operates according to a failsafe mode (e.g., such as described with reference to steps 2114-2118) in response to detecting a loss of power (resulting from a power outage or any other interruption in the supply of power from the power source 500 to the actuator 1800). A power loss at step 2102 may be detected using any number of devices and/or methods, e.g., via the optionally provided voltage detector 1870. In some embodiments, the actuator 1800 may be configured to register a detected interruption of power to the actuator 1800 as a power loss at step 2102 only after a predetermined period of time has elapsed. This may prevent unnecessary operation of the actuator 1800 in the failsafe mode in response to brief minor interruptions in power from the power source 500.

An exemplary first mode of operation of the actuator 1800 is described with references to steps 2104-2112. As shown in step 2104, power from the power source 500 is used to charge the energy storage element 1820 (e.g. a capacitor) of the actuator 1800, according to any of the charging modes described above. At step 2106 the drive device 1810 receives energy from the power source 500—either indirectly through the energy storage element 1820 (as described with reference to FIG. 18) or directly from the power source 500 (as described with reference to FIG. 19).

During step 2108 the drive device 1810 uses the energy received at step 2106 to drive the valve member 204 along the travel path 901 of the valve 200 in accordance to instructions received from the actuator controller 1830. When the actuator 1800 operates in the first mode (such as, e.g., described in steps 2104-2112) the instructions provided by the actuator controller 1830 to the drive device 1810 at step 2108 may be based on any number of variables and sources. As non-limiting examples, the instructions provided by the actuator controller 1830 to the drive device 1810 at step 2018 may be based on any one or more of: programmed actuator controller 1830 modes; information or sensed conditions received from sensors 1850 and/or external sensors via the communications interface 1833; information from the fluid system controller 1002; user inputs received via the user input 1860; etc. Notably, when the actuator 1800 operates in the first mode, the manner in which the actuator controller 1830 instructs the drive device 1810 during step 2108 may vary over the course of the operation of the actuator 1800.

As the drive device 1810 effectuates the movement of the valve member 204 along the travel path 901 to one or more valve member 204 orientations responsive to the energy received from the power source 500 (step 2106) and the instructions from the actuator controller (step 2108), the actuator controller 1830 monitors the position of the valve member 204 (e.g., using optional position sensor 1840) at step 2110. In actuator 1800 embodiments that allow some or all of the failsafe setpoints to be varied, the actuator 1800 at step 2112 updates the failsafe setpoint(s) stored in the memory 1835 as needed to reflect changes to the failsafe setpoint.

An exemplary method of operation of the actuator 1800 in a failsafe mode in response to detecting a power loss at step 2102 is shown in steps 2114-2118. As shown at step 2114, upon the detection of a power loss at step 2102, the actuator controller 1830 generates a drive signal (described in more detail in FIG. 22) configured to instruct the drive device 1810 to drive the valve member 204 to the appropriate failsafe setpoint. As shown in step 2116, the drive device 1810 is supplied with energy from the energy storage element 1820. The drive device 1810 effectuates the movement of the valve member 204 to the failsafe setpoint designated in the instructions received from the actuator controller 1830 (at step 2114) using the energy from the energy storage element 1820 (at step 2116) during step 2118. Upon power to the actuator 1800 being restored, the actuator 1800 may revert to operating the valve 200 in accordance to the first operational mode (e.g., as described with reference to steps 2104-2112).

Figure 22:
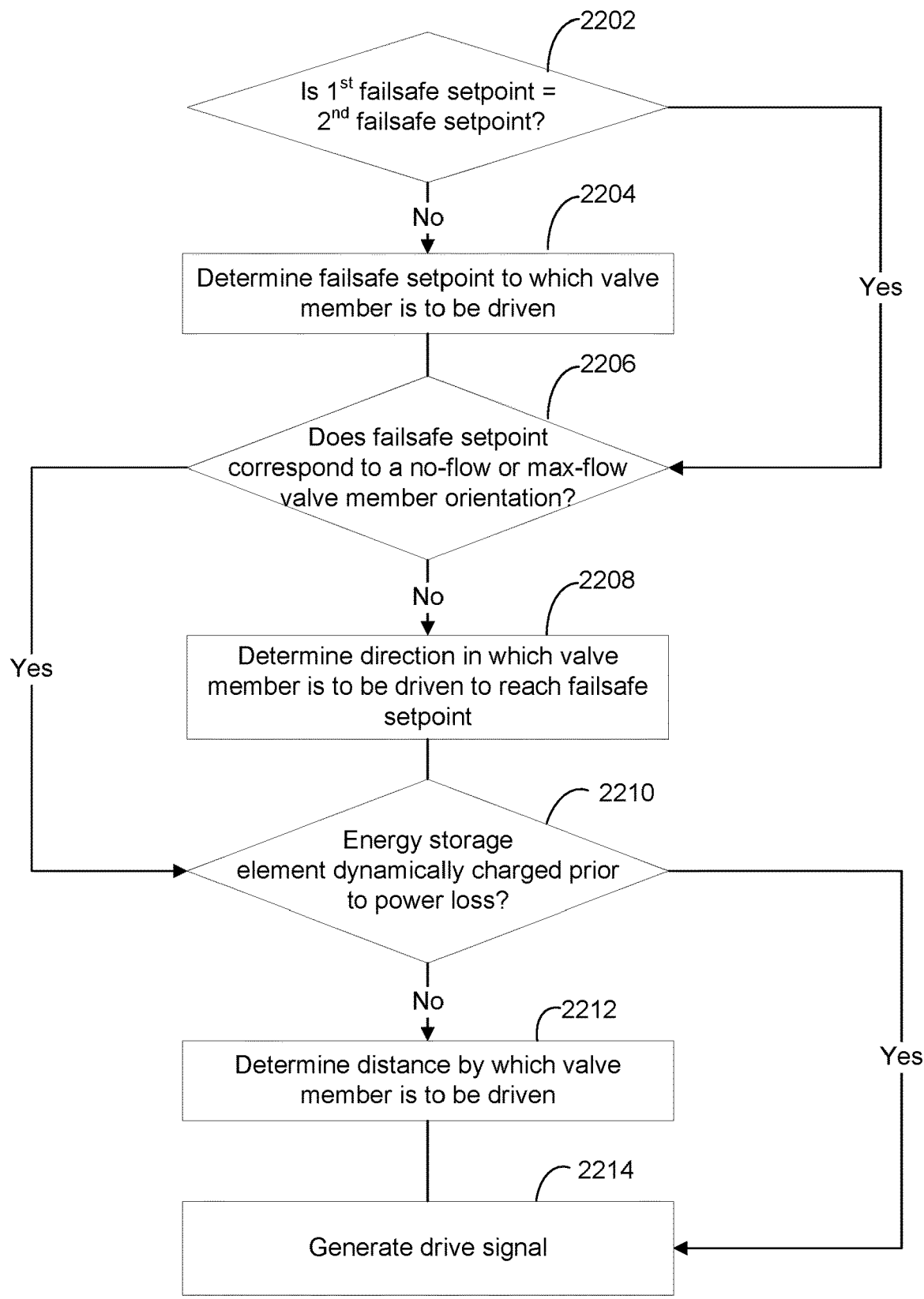
FIG. 22 is a flow chart of a process for generating a failsafe system drive signal, according to an exemplary embodiment.

Referring to FIG. 22, a method of generating a drive signal (such as, e.g., during step 2114 of the method of FIG. 21) configured to effectuate the movement of the valve member 204 to a desired failsafe setpoint is illustrated according to one embodiment. Notably, the actuator controller 1830 may receive sufficient energy from the energy storage element 1820 during the detected power loss event sufficient to generate the drive signal as described, e.g., with reference to FIGS. 21 and 22.

Given the ability of the actuator 1800 to drive the valve member 204 to different failsafe setpoints depending on the fluid supply source being controlled by the actuator 1800 upon the detection of a loss of power from the power source 500, as an initial step in generating the drive signal, the actuator controller 1830 determines which of the stored failsafe setpoints (i.e. the first failsafe setpoint 1802a or the second failsafe setpoint 1802b) the valve member 204 is to be driven to. As shown in step 2202, in embodiments in which each of the first failsafe setpoint 1802a and the second fail safe setpoint 1802b (and any additionally stored fail safe setpoints) correspond to the same valve member 204 orientation, the determination of the fail safe setpoint may entail no more than retrieving the stored failsafe setpoint from the memory 1835 of the actuator controller 1830.

However, in embodiments in which the first failsafe setpoint 1802a and the second failsafe setpoint 1802b correspond to different valve member 204 orientations, the actuator controller 1830 at step 2202 determines which failsafe setpoint (i.e. the first failsafe setpoint or the second failsafe setpoint) to which the valve member 204 is to be driven by determining the fluid source that was being controlled by the actuator 1800 during the loss of power to the actuator 1800. The actuator controller 1830 may determine the fluid source that was last operated by the actuator 1200 using any number of different methods and sources of information. For example, according to various embodiments, the actuator controller 1830 may utilize the optionally provided position sensor 1840 to determine the location of the valve member 204 along the travel path 901, using which the actuator controller 1830 may determine the fluid supply source being controlled by the actuator 1800 at the time of the power loss. In other embodiments, the actuator controller 1830 may alternatively, or additionally, receive information from the fluid system controller 1002 indicative of the fluid supply that was being controlled at the time of the power loss.

In addition to identifying the failsafe setpoint (i.e. the first failsafe setpoint 1802a or the second failsafe setpoint 1802b) to which the valve member 204 is to be driven, the actuator controller 1830 additionally identifies the direction in which the valve member 204 is to be driven to reach the failsafe setpoint to generate the drive signal. As described above, valve 200 is defined by a flow path in which a maximum first fluid supply source flow valve member 204 orientation is defined by a first end of the travel path 901 of the valve member 204, the maximum second fluid supply source flow valve member 204 orientation is defined at a second end of the travel path 901, and a portion of the travel path 901 defined between the first end and the second end is defined by a no-flow valve member 204 orientation). Accordingly, in embodiments in which the actuator 1800 is used with valve 200 and the failsafe setpoint determined at step 2206 corresponds to valve member 204 orientation defined by either a first end or a second end of a fluid source supply travel path 901 (i.e. a maximum flow orientation or a no-flow orientation), the determination of the direction in which the valve member 204 is to be driven at may be made solely based on the failsafe setpoint and fluid supply source identified as having been last controlled by the actuator 1800 at step 2204.

In embodiments in which the valve 200 with which the actuator 1800 is used is defined by a travel path 901 different than that of valve 200 and/or the failsafe setpoint determined at step 2204 does not correspond to either a maximum flow or no-flow valve member 204 orientation, the actuator controller 1830 at step 2208 determines whether the valve member 204 is to be driven in a first direction or in a second, opposite direction (e.g., in a CW or a CCW direction) based on a comparison of the current position of the valve member 204 (such as, e.g., obtained at step 2204) to the failsafe setpoint to which the valve member 204 is to be driven.

The drive signal generated by the actuator controller 1830 may additionally include instructions that correspond to the distance by which the valve member 204 is to be driven by the drive device 1810 to reach the desired failsafe setpoint. As shown at step 2210, in embodiments in which the energy storage element 1820 was dynamically charged during operation of the actuator 1800 according to the first mode (such that the energy stored by the energy storage element 1820 corresponds to the energy required to drive the drive device 1810 to the failsafe setpoint from the current position of the valve member 204), the drive signal generated at step 2214 by the actuator controller 1830 may optionally only include instructions as to the direction in which the drive device 1810 is to drive the valve member 204. In embodiments in which the actuator controller 1830 optionally additionally stores information regarding the current position of the valve member 204 relative to the failsafe setpoint during the dynamic charging of the energy storage element 1820, the actuator controller 1830 may generate the drive signal at step 2214 without requiring any additional information and/or calculations as described with reference to steps 2202-2212.

However, in embodiments in which the energy storage element 1820 was not dynamically charged during normal operation of the fluid system 100, the actuator controller 1830 at step 2212 determines the distance by which the valve member 204 is to be driven to reach the failsafe setpoint from the current valve member 204 position (and the corresponding amount of energy required to drive the drive device 1810 the calculated distance along the travel path 901). At step 2214, a drive signal (including instructions associated with the amount of energy to be discharged by the energy storage element 1820 to the drive device 1810 4 and/or instructions regarding the direction in which, the setpoint to which, and/or the distance by which the drive device 1810 is to drive the valve member 204) is generated by the actuator controller 1830 based on the information obtained during steps 2202-2212. As shown by step 2118 of the exemplary method of FIG. 21, upon receiving the drive signal generated by the actuator controller 1830, the drive device 1810 may drive the valve 200 to the failsafe setpoint.

Although in the methods illustrated by FIGS. 21 and 22 the drive signal has been described as being generated solely by the actuator controller 1830, according to other embodiments, some or all of the drive signal instructions regarding the amount of energy to be discharged by the energy storage element 1820 and/or the drive signal instructions regarding the direction in which, the setpoint to which, and/or the distance by which the drive device 1810 is to drive the valve member 204 may be generated by other controllers or control elements of the actuator 1800 (e.g., a motor controller, etc.).

The construction and arrangement of the systems and methods as shown in the various exemplary embodiments are illustrative only. Although only a few implementations of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited.

Numerous specific details are described to provide a thorough understanding of the disclosure. However, in certain instances, well-known or conventional details are not described in order to avoid obscuring the description. References to "some embodiments," "one embodiment," "an exemplary embodiment," and/or "various embodiments" in the present disclosure can be, but not necessarily are, references to the same embodiment and such references mean at least one of the embodiments.

Alternative language and synonyms may be used for anyone or more of the terms discussed herein. No special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

The elements and assemblies may be constructed from any of a wide variety of materials that provide sufficient strength or durability, in any of a wide variety of colors, textures, and combinations. Further, elements shown as integrally formed may be constructed of multiple parts or elements.

As used herein, the word "exemplary" is used to mean serving as an example, instance or illustration. Any implementation or design described herein as "exemplary" is not necessarily to be construed as preferred or advantageous over other implementations or designs. Rather, use of the word exemplary is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary implementations without departing from the scope of the appended claims.

As used herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

As used herein, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EPSOM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media.

Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

We claim:

1. An actuator comprising:
a drive device;
an energy storage element; and
a controller that operates in a first mode when the actuator receives power from an external power source and in a second mode when a loss of power from the external power source to the actuator is detected, wherein the controller generates a failsafe drive signal in response to detecting the loss of power to the actuator from the external power source;
wherein, in the first mode, the controller controls the drive device to effectuate a flow of fluid from one of a first fluid source and a second fluid source through a valve to which the drive device is operably attached; and
wherein, in the second mode, upon the loss of power to the actuator, the drive device drives a valve member of the valve to which the actuator is operably coupled in a first direction to a first position along a travel path corresponding to a first valve member orientation in which an outlet of the valve is blocked by the valve member in response to a first failsafe drive signal from the controller, and drives the valve member in a second direction, opposite the first direction, to a second position along the travel path corresponding to a second valve member orientation in which the outlet of the valve is blocked by the valve member, in response to a second failsafe drive signal from the controller; and
wherein the drive device drives the valve member using energy received from the energy storage element.

2. The actuator of claim 1, wherein the drive device comprises a motor.

3. The actuator of claim 1, wherein the energy storage element is charged by the external power source while energy from the external power source is used to power the drive device.

4. The actuator of claim 1, wherein energy from the external power source is received by the energy storage element while the drive device receives energy from the energy storage element.

5. The actuator of claim 1, wherein no energy from the external power source is received by the energy storage element while the drive device receives energy from the energy storage element.

6. An actuator comprising:
a drive device;
an energy storage element; and
a controller that generates a failsafe drive signal in response to detecting a loss of power to the actuator from an external power source;
wherein, upon the loss of power to the actuator, the drive device drives a valve member of a valve to which the actuator is operably coupled in a first direction to a first position along a travel path corresponding to a first valve member orientation in which an outlet of the valve is blocked by the valve member in response to a first failsafe drive signal from the controller, and drives the valve member in a second direction, opposite the first direction, to a second position along the travel path corresponding to a second valve member orientation in which the outlet of the valve is blocked by the valve member, in response to a second failsafe drive signal from the controller; and
wherein the drive device drives the valve member using energy received from the energy storage element.

7. The actuator of claim 6, wherein the controller generates the first failsafe drive signal in response to determining that the actuator is being operated to control a flow of fluid from a first fluid supply source through the valve, and generates the second failsafe drive signal in response to determining that the actuator is being operated to control a flow of fluid from a second fluid supply source through the valve.

8. The actuator of claim 7, wherein the valve controlled by the actuator defines a valve member travel path in which a first end of the travel path defines a valve member orientation corresponding to a maximum flow of fluid from the first fluid supply source through the valve outlet, a second end of the travel path defines a valve member orientation corresponding to a maximum flow of fluid from the second fluid supply source through the valve outlet, and a no-flow portion of the travel path located between the first end and the second end corresponds to one or more valve member orientations in which the outlet of the valve is blocked by the valve member.

9. The actuator of claim 8, wherein the first position and the second position correspond to the same valve member orientation.

10. The actuator of claim 8, wherein the first position and the second position correspond to different valve member orientations.

11. The actuator of claim 10, wherein a first travel path portion in which the first fluid supply source is in fluid communication with the valve outlet is defined between the first end and the no-flow portion of the travel path, and a second travel path portion in which the second fluid supply source is in fluid communication with the valve outlet is defined between the second end and the no-flow portion of the travel path; and
wherein the first position is located at a position along the no-flow portion of the travel path adjacent the first travel path portion, and the second position is located at a position along the no-flow portion of the travel path adjacent the second travel path portion.

12. The actuator of claim 6, wherein the drive device comprises a motor.

13. The actuator of claim 12, wherein the motor is operated using energy from the energy storage element when energy from the external power source is received by the actuator.

14. The actuator of claim 13, wherein the energy storage element is charged by the external power source when the motor is operated using energy from the external power source.

15. The actuator of claim 12, wherein no energy from the external power source is received by the motor while the motor is operated using energy from the energy storage element.

* * * * *